(12) United States Patent
Bowman et al.

(10) Patent No.: US 10,185,946 B2
(45) Date of Patent: Jan. 22, 2019

(54) FACILITATING PRESENTATION OF CONTENT RELATING TO A FINANCIAL TRANSACTION

(71) Applicant: Fiserv, Inc., Brookfield, WI (US)

(72) Inventors: Mark Edward Bowman, Canton, GA (US); Mark T. Harris, Blowing Rock, NC (US); Sherry Pleasant Sondergaard, Berkeley Lake, GA (US); John Alexander Kell, Decatur, GA (US)

(73) Assignee: FISERV, INC., Brookfield, WI (US)

( * ) Notice: Subject to any disclaimer, the term of this patent is extended or adjusted under 35 U.S.C. 154(b) by 648 days.

(21) Appl. No.: 14/588,156

(22) Filed: Dec. 31, 2014

(65) Prior Publication Data

US 2016/0189119 A1   Jun. 30, 2016

(51) Int. Cl.
*G06Q 20/24* (2012.01)
*G06Q 20/04* (2012.01)
*G06Q 20/38* (2012.01)

(52) U.S. Cl.
CPC ......... *G06Q 20/24* (2013.01); *G06Q 20/0453* (2013.01); *G06Q 20/3821* (2013.01)

(58) Field of Classification Search
USPC .......................................................... 705/39
See application file for complete search history.

(56) References Cited

U.S. PATENT DOCUMENTS

| | | | |
|---|---|---|---|
| 4,346,442 A | 8/1982 | Musmanno | |
| 4,649,563 A | 3/1987 | Riskin | |
| 4,694,397 A | 9/1987 | Grant et al. | |
| 4,823,264 A | 4/1989 | Deming | |
| 5,220,501 A | 6/1993 | Lawlor et al. | |
| 5,383,113 A | 1/1995 | Kight et al. | |
| 5,424,938 A | 6/1995 | Wagner et al. | |
| 5,481,720 A | 1/1996 | Loucks et al. | |
| 5,504,677 A | 4/1996 | Pollin | |

(Continued)

FOREIGN PATENT DOCUMENTS

| EP | 0567291 | 7/2000 |
|---|---|---|
| GB | 2392262 A | 2/2004 |

(Continued)

OTHER PUBLICATIONS

US 5,351,994, 10/1994, Pollin (withdrawn)

(Continued)

*Primary Examiner* — Abhishek Vyas
*Assistant Examiner* — James H Miller
(74) *Attorney, Agent, or Firm* — Alston & Bird LLP

(57) ABSTRACT

Systems, methods and computer-readable media for facilitating the provision of content associated with a financial transaction are disclosed. The content may be identified by a requestor of the financial transaction or any party to the financial transaction. The content may also be generated by a service provider system that executes the financial transaction. A content location identifier that identifies a location where the content is stored may be identified or generated and may be included in or otherwise provided in association with a debit or credit instruction. The content location identifier may facilitate access to the content by any of a variety of systems or users.

18 Claims, 13 Drawing Sheets

(56) References Cited

U.S. PATENT DOCUMENTS

| | | |
|---|---|---|
| 5,644,727 A | 7/1997 | Atkins |
| 5,696,902 A | 12/1997 | Leclercq et al. |
| 5,745,706 A | 4/1998 | Wolfberg et al. |
| 5,774,553 A | 6/1998 | Rosen |
| 5,787,427 A | 7/1998 | Benantar et al. |
| 5,805,719 A | 9/1998 | Pare, Jr. et al. |
| 5,826,243 A | 10/1998 | Musmanno et al. |
| 5,855,020 A | 12/1998 | Kirsch |
| 5,870,724 A | 2/1999 | Lawlor et al. |
| 5,884,285 A | 3/1999 | Atkins |
| 5,884,288 A | 3/1999 | Chang et al. |
| 5,893,078 A | 4/1999 | Paulson |
| 5,940,809 A | 8/1999 | Musmanno et al. |
| 5,963,925 A | 10/1999 | Kolling et al. |
| 5,966,698 A | 10/1999 | Pollin |
| 5,974,146 A | 10/1999 | Randle et al. |
| 6,012,048 A | 1/2000 | Gustin et al. |
| 6,018,722 A | 1/2000 | Ray et al. |
| 6,038,603 A | 3/2000 | Joseph |
| 6,039,245 A * | 3/2000 | Symonds ............. G06Q 20/202 235/379 |
| 6,058,378 A | 5/2000 | Clark et al. |
| 6,070,150 A * | 5/2000 | Remington ............ G06Q 20/04 705/34 |
| 6,108,641 A | 8/2000 | Kenna et al. |
| 6,108,788 A | 8/2000 | Moses et al. |
| 6,173,272 B1 | 1/2001 | Thomas et al. |
| 6,199,077 B1 | 3/2001 | Inala et al. |
| 6,226,623 B1 | 5/2001 | Schein et al. |
| 6,240,399 B1 | 5/2001 | Frank et al. |
| 6,292,789 B1 | 9/2001 | Schutzer |
| 6,304,860 B1 | 10/2001 | Martin et al. |
| 6,311,170 B1 | 10/2001 | Embrey |
| 6,317,783 B1 | 11/2001 | Freishtat et al. |
| 6,321,334 B1 | 11/2001 | Jerger et al. |
| 6,324,523 B1 | 11/2001 | Killeen, Jr. et al. |
| 6,374,231 B1 | 4/2002 | Bent et al. |
| 6,381,592 B1 | 4/2002 | Reuning |
| 6,385,595 B1 | 5/2002 | Kolling |
| 6,389,538 B1 | 5/2002 | Gruse et al. |
| 6,405,245 B1 | 6/2002 | Burson et al. |
| 6,412,073 B1 | 6/2002 | Rangan |
| 6,473,800 B1 | 10/2002 | Jerger et al. |
| 6,510,451 B2 | 1/2003 | Wu et al. |
| 6,513,019 B2 | 1/2003 | Lewis |
| 6,567,850 B1 | 5/2003 | Freishtat et al. |
| 6,594,766 B2 | 7/2003 | Rangan et al. |
| 6,598,028 B1 | 7/2003 | Sullivan et al. |
| 6,606,606 B2 | 8/2003 | Starr |
| 6,609,128 B1 | 8/2003 | Underwood |
| 6,633,910 B2 | 10/2003 | Rajan et al. |
| 6,658,568 B1 | 12/2003 | Ginter et al. |
| 6,697,860 B1 | 2/2004 | Kung |
| 6,721,716 B1 | 4/2004 | Gross |
| 6,792,082 B1 | 9/2004 | Levine |
| 6,799,167 B1 | 9/2004 | Gullen et al. |
| 6,802,042 B2 | 10/2004 | Rangan et al. |
| 6,826,542 B1 | 11/2004 | Virgin |
| 6,850,996 B2 | 2/2005 | Wagner |
| 6,922,673 B2 | 7/2005 | Karas et al. |
| 7,003,500 B1 | 2/2006 | Driessen |
| 7,013,310 B2 | 3/2006 | Messing et al. |
| 7,031,939 B1 | 4/2006 | Gallagher et al. |
| 7,089,208 B1 | 8/2006 | Levchin et al. |
| 7,120,608 B1 | 10/2006 | Gallagher et al. |
| 7,130,807 B1 | 10/2006 | Mikurak |
| 7,130,817 B2 | 10/2006 | Karas et al. |
| 7,146,338 B2 | 12/2006 | Kight et al. |
| 7,177,836 B1 | 2/2007 | German et al. |
| 7,191,151 B1 | 3/2007 | Nosek |
| 7,216,104 B2 | 5/2007 | Mason |
| 7,328,844 B2 | 2/2008 | Workens |
| 7,373,329 B2 | 5/2008 | Gallagher et al. |
| 7,376,587 B1 | 5/2008 | Neofytides |
| 7,383,223 B1 | 6/2008 | Dilip et al. |
| 7,430,537 B2 | 9/2008 | Templeton |
| 7,502,749 B2 | 3/2009 | Ganesan |
| 7,512,552 B2 | 3/2009 | Karas et al. |
| 7,562,037 B2 | 7/2009 | Wright |
| 7,587,342 B2 | 9/2009 | Neofytides et al. |
| 7,587,363 B2 | 9/2009 | Cataline et al. |
| 7,596,529 B2 | 9/2009 | Mascavage, III et al. |
| 7,606,734 B2 | 10/2009 | Baig et al. |
| 7,653,598 B1 | 1/2010 | Hamilton et al. |
| 7,676,431 B2 | 3/2010 | O'Leary et al. |
| 7,676,434 B2 | 3/2010 | Evans |
| 7,689,482 B2 | 3/2010 | Lam |
| 7,702,579 B2 | 4/2010 | Neely et al. |
| 7,747,523 B2 | 6/2010 | Cohen |
| 7,788,172 B2 | 8/2010 | Kight et al. |
| 7,809,615 B2 | 10/2010 | Hui |
| 7,953,663 B1 | 5/2011 | LeKachman |
| 7,995,118 B2 | 8/2011 | Rothschild |
| 8,041,646 B2 | 10/2011 | Bajan |
| 8,170,954 B2 | 5/2012 | Keresman et al. |
| 8,626,659 B1 * | 1/2014 | Bowman ............... G06Q 20/24 235/380 |
| 2002/0002536 A1 | 1/2002 | Braco |
| 2002/0010768 A1 | 1/2002 | Marks et al. |
| 2002/0019753 A1 | 2/2002 | Boden |
| 2002/0023215 A1 | 2/2002 | Ding et al. |
| 2002/0087461 A1 | 7/2002 | Ganesan et al. |
| 2002/0097715 A1 * | 7/2002 | Roerick ................ G06Q 30/06 370/389 |
| 2002/0107767 A1 | 8/2002 | McClair et al. |
| 2002/0116331 A1 | 8/2002 | Cataline et al. |
| 2003/0097331 A1 | 5/2003 | Cohen |
| 2003/0154164 A1 | 8/2003 | Mascavage et al. |
| 2004/0019560 A1 | 1/2004 | Evans et al. |
| 2004/0059672 A1 | 3/2004 | Baig et al. |
| 2004/0107164 A1 | 6/2004 | Ghiloni et al. |
| 2004/0199472 A1 * | 10/2004 | Dobbins .............. G06Q 20/123 705/50 |
| 2004/0215560 A1 | 10/2004 | Amalraj et al. |
| 2005/0108155 A1 | 5/2005 | Gallagher et al. |
| 2005/0127165 A1 | 6/2005 | Currey |
| 2005/0131813 A1 | 6/2005 | Gallagher et al. |
| 2006/0015450 A1 | 1/2006 | Guck et al. |
| 2006/0020542 A1 | 1/2006 | Litle et al. |
| 2006/0059065 A1 | 3/2006 | Glinberg et al. |
| 2006/0195398 A1 | 8/2006 | Dheer et al. |
| 2006/0206419 A1 | 9/2006 | Rosti et al. |
| 2006/0242085 A1 | 10/2006 | Jones et al. |
| 2006/0253340 A1 | 11/2006 | Levchin |
| 2006/0265325 A1 | 11/2006 | Fajardo |
| 2007/0011099 A1 | 1/2007 | Sheehan |
| 2007/0061257 A1 | 3/2007 | Neofytides et al. |
| 2007/0094113 A1 | 4/2007 | Chapeta |
| 2007/0100748 A1 * | 5/2007 | Dheer ................... G06Q 20/10 705/39 |
| 2007/0192245 A1 | 8/2007 | Fisher et al. |
| 2007/0192249 A1 | 8/2007 | Biffle et al. |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro et al. |
| 2008/0005001 A1 | 1/2008 | Davis et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010215 A1 | 1/2008 | Rackley, III et al. |
| 2008/0046362 A1 | 2/2008 | Easterly |
| 2008/0126145 A1 | 5/2008 | Rackley, III et al. |
| 2008/0133403 A1 | 6/2008 | Hamzeh |
| 2008/0154772 A1 | 6/2008 | Carlson |
| 2008/0270246 A1 | 10/2008 | Chen |
| 2008/0288376 A1 | 11/2008 | Panthaki et al. |
| 2008/0288400 A1 | 11/2008 | Panthaki et al. |
| 2008/0301022 A1 | 12/2008 | Patel et al. |
| 2008/0312998 A1 | 12/2008 | Templeton |
| 2008/0319873 A1 | 12/2008 | Levchin et al. |
| 2008/0319874 A1 | 12/2008 | Levchin et al. |
| 2008/0319875 A1 | 12/2008 | Levchin et al. |

(56) References Cited

U.S. PATENT DOCUMENTS

| | | |
|---|---|---|
| 2008/0319899 A1 | 12/2008 | Levchin et al. |
| 2009/0024523 A1 | 1/2009 | Baig et al. |
| 2009/0094155 A1 | 4/2009 | Baig et al. |
| 2009/0276359 A1 | 11/2009 | Panthaki et al. |
| 2009/0287599 A1 | 11/2009 | Lamar, III |
| 2009/0319410 A1 | 12/2009 | Kight et al. |
| 2010/0030687 A1 | 2/2010 | Panthaki et al. |
| 2010/0042538 A1 | 2/2010 | Dheer et al. |
| 2010/0042539 A1 | 2/2010 | Dheer et al. |
| 2011/0196790 A1 | 8/2011 | Milne |
| 2011/0320347 A1 | 12/2011 | Tumminaro et al. |
| 2012/0084205 A1 | 4/2012 | Dheer et al. |
| 2012/0136781 A1 | 5/2012 | Fridman et al. |
| 2012/0151515 A1 | 6/2012 | Atsmon et al. |
| 2012/0173409 A1 | 7/2012 | Hu |
| 2012/0173422 A1 | 7/2012 | Hu |
| 2012/0239559 A1 | 9/2012 | O'Leary et al. |
| 2012/0323762 A1 | 12/2012 | Kapur et al. |
| 2013/0103577 A1 | 4/2013 | Lawson |
| 2013/0246274 A1 | 9/2013 | Marcous et al. |
| 2013/0262295 A1* | 10/2013 | Narayanan ............. G06Q 20/30 705/39 |
| 2014/0032391 A1 | 1/2014 | Kapur et al. |
| 2014/0032407 A1 | 1/2014 | Kapur et al. |
| 2014/0067670 A1 | 3/2014 | Dheer et al. |
| 2014/0067672 A1 | 3/2014 | Dheer et al. |
| 2014/0074724 A1 | 3/2014 | Gordon et al. |
| 2014/0089169 A1 | 3/2014 | Kapur et al. |
| 2014/0089205 A1 | 3/2014 | Kapur et al. |
| 2014/0108238 A1* | 4/2014 | Boding ............. G06Q 20/4016 705/39 |
| 2014/0108239 A1 | 4/2014 | Bowman et al. |
| 2014/0188728 A1 | 7/2014 | Dheer et al. |
| 2015/0142663 A1 | 5/2015 | Lawson et al. |
| 2015/0154570 A1 | 6/2015 | Dheer et al. |
| 2015/0199670 A1 | 7/2015 | Dheer et al. |

FOREIGN PATENT DOCUMENTS

| | | | |
|---|---|---|---|
| JP | 10149404 A | | 2/1998 |
| JP | 2008033566 A | * | 2/2008 |
| WO | 9719406 | | 5/1997 |
| WO | 0188674 A2 | | 11/2001 |

OTHER PUBLICATIONS

Sposito, Sean, "Dwolla Pitches Fast Fund Transfers, but Bank Participation is Vital," American Banker, May 8, 2012, 2 pgs.

Quittner, Jeremy, "Dwolla's Speedy Alternative to ACH," American Banker, Oct. 1, 2012.

"Faster Payments Managed Service," VocaLink website, Factsheet, 2012.

"Multi-Channel Gateway," VocaLink website, 2012.

"VocaLink partners with Clairmail to offer innovative real-time banking solutions through the mobile channel," VocaLink website, Press Releases 2012, Mar. 13, 2012.

Schneier Bruce "Applied Cryptography Protocols Algorithms and Source Code in C" 1996 pp. 30-32 Second Edition John Wiley & Sons Inc.

Dartmouth Research & Consulting Glossaries Banking Glossary 2000 pp. 1-11.

Latest EPA Developments PR Newswire Jul. 21, 2001 7 pgs. New York.

International Search Report for related International Application No. PCT/US2009/31602 dated Mar. 9, 2009.

Written Opinion of the International Searching Authority for related International Application No. PCT/US2009/31602 dated Mar. 9, 2009.

"Zions Bancorporation Selects CheckFree's PEP+ Platinum Suite to Enhance ACH Processing," Aug. 23, 2007; PR Newswire.

"Fiserv, Inc.; Fiserv Makes ACH Processing Easier and Less Expensive," Apr. 25, 2009; Real Estate & Investment Week.

Bruno-Britz, Maria, "Fiserv Releases New PEP+ Module for NOCs," Sep. 10, 2009; Bank Systems & Technology.

"CheckFree Supports ACH Globalization with PEP+ Software Platform," Nov. 3, 2003; PR Newswire.

* cited by examiner

GENERIC FINANCIAL INSTITUTION

GENERIC FINANCIAL INSTITUTION
P.O. Box 11111
City, STATE 11111-1111

Page 1 of 3
Statement Period
1-1-12 through 2-1-12
Account Number: xxxxx-xxxxx

| Posting Date | Amount | Resulting Balance | Transaction Information |
|---|---|---|---|
| 1-10-12 | $40.00 | $4000.00 | La Familia Restaurant Purchase |
| 1-08-12 | $1000.00 | $3000.00 | P2P Transfer to CHK XXXXX |

FIG. 10

FACILITATING PRESENTATION OF CONTENT RELATING TO A FINANCIAL TRANSACTION

BACKGROUND

With the advent of the digital age, financial account holders are increasingly relying on online platforms to manage their financial accounts, initiate financial transactions, and obtain information relating to their financial accounts. These online platforms may support a variety of software applications such as online financial applications (e.g., online banking applications) rendered by traditional web browsers running on desktop or laptop devices, online financial applications rendered by mobile browsers running on mobile devices such as smartphones or tablets, dedicated smartphone or tablet mobile banking or other financial applications, and so forth. These online applications have dramatically increased the speed and efficiency with which financial account holders are able to conduct financial transactions and manage their financial accounts.

In addition to providing functionality for initiating financial transactions and managing financial accounts, online financial applications generally provide financial account holders with various financial transaction and account information relating to pending and processed financial transactions. Such information may include a posting date of a transaction, a transaction amount, a brief description of the transaction, an available financial account balance, and so forth.

BRIEF DESCRIPTION OF THE DRAWINGS

The detailed description is set forth with reference to the accompanying drawings. Use of the same reference numerals indicates similar or identical components or elements; however, similar components or elements may also be designated with different reference numerals. Various embodiments of the disclosure may utilize elements or components other than those illustrated in the accompanying drawings and some elements and/or components may not be present in one or more embodiments. It should be appreciated that while singular terminology may be used to describe various components or elements, a plural number of such components or elements is also within the scope of the disclosure.

FIG. 10 depicts an illustrative presentation of information associated with a financial account that includes various representations of various illustrative types of content relating to a financial transaction in accordance with one or more embodiments of the disclosure.

DETAILED DESCRIPTION

Overview

Figure 1A:
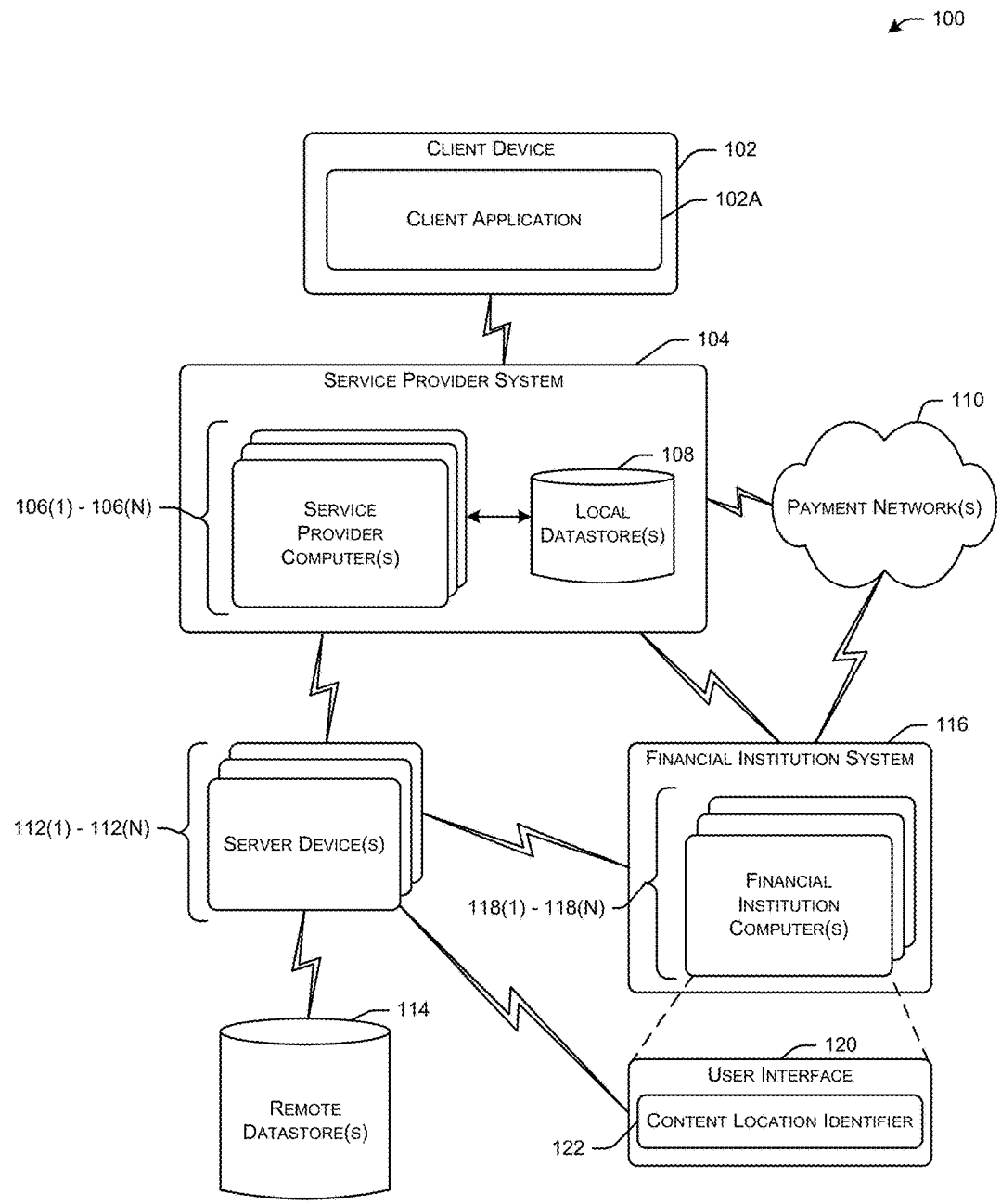
FIG. 1A schematically depicts an illustrative networked architecture for facilitating presentation of content relating to a financial transaction in accordance with one or more embodiments of the disclosure.

Online financial applications such as online banking applications may provide a financial account holder with information relating to a financial account such as transaction and account details. Account statements, whether mailed or delivered in electronic form, may also provide transaction and account details. To date, however, the nature of the transactional and account information provided to a financial account holder through an online interface or in a paper statement has been limited in scope. Conventionally, such information has been limited to transaction amounts, account balance information, posting dates, minimal descriptions of the type/nature of the transactions, or similar information. Further, while account holders may have some degree of control over the formatting or arrangement of the information presented via an online banking interface, they generally are not able to control the type, nature, or scope of information that is presented. Further, conventional online financial account interfaces (e.g., online banking interfaces, online credit card interfaces, etc.) and client applications for initiating financial transactions (e.g., bill payments, person-to-person (P2P) payments and requests for payments, account-to-account (A2A) funds transfers, retail payments, and check deposits) fail to provide a mechanism by which a requestor associated with a financial transaction (e.g., an account holder) can identify content relating to a financial transaction and associate the content with the financial transaction such that the content may be presented to a user (e.g., an account holder) via an online financial account interface or as part of a downloadable or mailed account statement. In addition, conventional service provider systems do not have the capability to generate content and a location identifier that identifies a location where the content is stored and insert the location identifier, and optionally at least a portion of the content, in debit and/or credit instructions corresponding to a financial transaction to allow a financial institution system that receives the debit or credit instruction to modify financial account data based on the content or to allow a party to the financial transaction to view the content.

This disclosure relates to systems, methods, and computer-readable media for facilitating the presentation of content relating to a financial transaction. A service provider system may receive a request associated with a financial transaction on behalf of a requestor. The request may be received, for example, from a client device that hosts any of a variety of types of client applications. An illustrative, non-exhaustive list of such client applications may include an online banking application or other financial application, a person-to-person (P2P) client application that supports functionality for transferring funds between financial accounts associated with different account holders (e.g., a P2P payment or a request for a P2P payment), a funds transfer application that supports functionality for transferring funds between financial accounts associated with a same account holder, a client application that supports functionality for electronic bill presentment and payment, a client application that supports functionality for remote deposit capture, an application or interface that facilitates retail payments, and so forth. In certain embodiments, the request may be received from a client application hosted by a merchant or a device or system associated with the merchant or other payee as part of a credit card transaction, a debit card transaction, a check payment, an Automated Clearinghouse (ACH) transaction, and so forth. The merchant or payee may be online or brick-and-mortar and the financial transaction may be an online transaction or a physical point-of-sale (POS) transaction.

The requestor may be any entity from whom the request associated with the financial transaction is received by the service provider system. For example, the requestor may be a party to the financial transaction (e.g., a payor, a payee etc.), a merchant that submits the financial transaction request based on authorization received from a payor, and/or an individual or other entity authorized to submit the request on behalf of an account holder of a financial account associated with the financial transaction. The financial transaction associated with the request may be any of a variety of types of financial transactions including, but not limited to, a bill payment, a P2P payment, a request for a P2P payment, a retail payment, an account-to-account transfer, a funds transfer, a check deposit, and so forth. In fact, the financial transaction may include any transaction according to which funds are transferred from one financial account to one or more other financial accounts. A financial account to be debited or credited as part of the financial transaction may include any of a variety of types of financial accounts including, but not limited to, a demand deposit account, a savings account, a money market account, a line of credit account, a debit card account, a credit card account, a prepaid card account, a stored value account, a loan account (e.g., an auto loan, a student loan, a mortgage loan, a personal loan, etc.), or a brokerage account.

It should be appreciated that the foregoing are not exhaustive listings of the types of client applications, financial transactions and/or financial accounts to which systems and methods of the disclosure may be applicable. Any financial transaction involving the exchange of value between any two or more value holding entities and any applications that support such value exchanges are within the scope of this disclosure.

The request may be associated with content relating to the financial transaction. The content may include any of a variety of types of content including textual content, one or more images, electronic or multimedia content such as audio and/or video content, and so forth. The textual content may include, but is not limited to, a textual description of the financial transaction, textual information associated with and/or generated by one or more parties to the financial transaction, and so forth. Illustrative examples of textual content include, but are not limited to, an electronic sales receipt, a purchase order, a sales invoice, a bill (e.g., a computer-generated bill provided in any suitable file format), or a greeting card associated with the financial transaction. Such textual content may be organized according to any suitable format for presentation in connection with an online account interface or within an account statement. For example, the textual content may be rich textual content that may be encoded in accordance with any suitable formatting specification such as any of those defined by any of a variety of markup languages (e.g., Extensible Markup Language (XML), Hypertext Markup Language (HTML), Extensible HyperText Markup Language (XHTML), Extensible Stylesheet Language (XSL), etc.). The textual content may have graphical elements, tags, metadata, and so forth associated therewith. The textual content may further or alternatively include remittance data/information (e.g., an identification of a biller/merchant account number with which a payment is to be associated, an identification of an additional principal payment included in the payment, etc.), or any other suitable type of structured data (e.g., a machine-readable sales receipt, a machine-readable electronic invoice, a machine-readable bill, a machine-readable payment coupon, etc.), that may be usable by one or more financial systems such as, for example, a financial institution's core account processing system, an accounts receivable system (e.g., any version of Oracle™'s Receivables software, Netsuite™'s ERP solution, etc.), a budgeting application that categorizes and tracks a consumer's expenses, an invoice management system, a customer relationship management (CRM) system, an identity management system, or the like. Such structured data may be, in certain example embodiments, generated by a service provider system such as a payment processor system that executes a financial transaction. Illustrative types of image content may include an image of an individual associated with the financial transaction (e.g., an image of an account holder of a financial account from which funds are to be debited in connection with the financial transaction, an image of an account holder of a financial account to which funds are to be credited in connection with the financial transaction, etc.), an image of an event associated with the financial transaction (e.g., an image of an event at which the financial transaction was initiated), an image of a purchased item associated with the financial transaction (e.g., an image of a product purchased as part of an online financial transaction or as part of a financial transaction initiated at a physical retail location), an image of a purchase order associated with the financial transaction, an image of an invoice or portion thereof (e.g., a remittance coupon) associated with the financial transaction, an image of a receipt associated with the financial transaction (e.g., an image of a physical or online-generated sales receipt), an image of a greeting card or message, and so forth.

In certain example embodiments, the service provider system may generate image content. For example, the service provider system may generate a check image corresponding to a financial transaction when no check or check image of the transaction is received by the service provider system. As another non-limiting example, the service provider system may generate an image using content included in a purchase order or invoice. As yet another non-limiting example, the service provider system may generate or retrieve from a third-party source an image of a product using a product identifier (e.g., a Universal Product Code (UPC)). As still another example, the service provider system may generate image data (e.g., an image of a recipient of a P2P payment) that is marked up with identification information that enables a payment to be made based on the image data. In certain example embodiments, the financial transaction requestor may provide the image and the service provider system may embed or otherwise associate the identification information with the image.

Illustrative types of electronic or multimedia content include, but are not limited to, audio files (e.g., digital music, audio books, other audio recordings, etc.), video files, electronic books (e-books), collections of images, content capable of being streamed, and so forth. Such electronic or multimedia content may be associated with and/or generated by one or more parties to the financial transaction or by a service provider system, or may be purchased or identified in connection with the financial transaction. It should be appreciated that the above-described examples of types of content that may be associated with a financial transaction are merely illustrative and that any of a variety of types of content are within the scope of this disclosure.

In various embodiments, the content relating to the financial transaction may be identified by the requestor of the financial transaction or a party to the financial transaction. In some embodiments, the requestor may also be a party to the financial transaction. For example, in the case of a request to make a P2P payment or a request to request a P2P payment, the requestor may be an account holder associated with a financial account to be debited or an account holder associated with a financial account to be credited. The requestor may also be an entity that is not a party to the financial transaction such as an account holder of a financial account associated with the financial transaction, but who is authorized to submit the request on behalf of the account holder (e.g., a user authorized to submit requests for P2P payments or requests for requests for P2P payments on behalf of a corresponding account holder). Various content (e.g., an image of an account holder associated with the financial account to be credited as part of the P2P payment, an image of an account holder associated with the financial account to be debited as part of the P2P payment, textual content, etc.) may be identified by the requestor. The client application (e.g., P2P client application, A2A client application, etc.) may provide an interface that allows the requestor or the party to the financial transaction (such as in those scenarios in which the requestor is a different entity from the party to the financial transaction) to attach, append, or otherwise associate the content with the request for the financial transaction. For example, the client application may provide functionality that allows the requestor or a party to the financial transaction who is not the requestor of the financial transaction to browse for content stored locally or remotely and to associate the content with the request. Alternatively, the requestor or the party to the financial transaction may designate or otherwise associate a location identifier with the request that identifies a resource where associated content is stored.

In certain example embodiments, a service provider system that executes a financial transaction requested by a requestor (e.g., a payment processor system that executes an online bill pay transaction) may generate the content to be associated with the financial transaction. As previously noted, the content generated by the service provider system may be structured data such as remittance data/information having a structure and/or format capable of being interpreted by one or more other systems (e.g., a core account processing system, an accounts receivable system, etc.). In other example embodiments, the content generated by the service provider system may be other types of textual content, image content, or multimedia content. For example, the service provider system may generate textual content, image content, and/or multimedia content corresponding to a sales receipt, an invoice, a bill, a payment coupon or voucher, terms and conditions for a purchase, terms of a loan (e.g., interest rate, loan term, etc.), share-of-wallet, contract terms, insurance terms for accepting funds, a passcode/registration code for a purchased membership, an instruction manual for a purchased item, and so forth. It should be appreciated that the above examples are merely illustrative and not exhaustive.

In certain embodiments, the requestor may correspond to the payor. In other embodiments, the requestor may be an entity other than the payor such as, for example, a merchant or payee associated with the financial transaction. For example, in the case of a credit card transaction in which a payment is made to a payee (e.g., a merchant), the requestor may be the merchant who submits a request for a financial transaction on behalf of the payor. In certain embodiments, the content may be identified by the payee independently of the payor. For example, the payee may identify content (e.g., a sales receipt, electronic content purchased as part of the financial transaction, etc.) based on the nature/type of the financial transaction.

In other embodiments, the payor (e.g., the credit card holder) may specify the type of content he/she wishes to associate with the financial transaction. As a non-limiting example, a payor may identify, as part of an online purchase of a product, content to associate with the financial transaction. Such content may include any suitable content such as, for example, an image of the product purchased, an image of a sales receipt for the product purchased or textual content included in the sales receipt, and so forth. A client application through which the payor initiates the financial transaction (e.g., by submitting payment information) may provide functionality for allowing the payor to identify or otherwise specify the content to be associated with the financial transaction. For example, the payor may be permitted to attach, append, or otherwise associate the content with the financial transaction. In other embodiments, the payee (e.g., merchant) may provide a set of options of content types to associate with the financial transaction. The payor may select one or more of the content types and the payee may associate corresponding content with the financial transaction. In such scenarios, the payee may identify or generate the content corresponding to the content types selected by the payor. In other example embodiments, a payor may specify content types via a client application used to submit a financial transaction request, and the service provider system that executes the financial transaction may identify or generate content corresponding to the content types selected by the payor. For example, in the bill payment context, the client application may present a user interface that displays, for example, a payment amount due and a payment due date. The user may provide user input that indicates a payment amount, a posting/transaction date for the payment, and additional information such as an amount of the payment to be applied towards a principal due or the like. The client application may package the received user input into a suitable format (e.g., an XML format) and submit the packaged information to the service provider system for insertion into a debit or credit instruction. In addition, in certain other example embodiments, the payor may specify that image content, textual content (e.g., electronic invoice information), or the like is to be associated with the financial transaction request, but may not include such content (or a content location identifier for retrieving such content) with the transaction request. In such example embodiments, the service provider system may generate or retrieve the image content or electronic invoice information from a third-party source. The payor may specify an invoice number with the request to enable the service provider system to generate or retrieve the electronic invoice information.

In certain other embodiments, the payor and the payee may each identify content relating to the financial transaction. For example, in the case of a financial transaction initiated in the context of an event or function, the payor may identify first content relating to the financial transaction (e.g., an image of the event) and the payee (e.g., the merchant) may identify second content relating to the financial transaction (e.g., an image of a sales receipt, a textual and/or graphical representation of the sales receipt, etc.). The first content and the second content may both be presented in association with the corresponding financial transaction via an online account interface or an account statement.

In various embodiments, the request associated with the financial transaction may include the content itself. As a non-limiting example, content associated with a P2P payment request may be supplied with the request by utilizing functionality provided by the client application through which the P2P payment request is submitted. For example, the client P2P application may provide a user with a capability to attach or append the content to the request. As another non-limiting example, a request received by the service provider system which is associated with an online purchase may include content (e.g., content purchased as part of the transaction, content relating to the product or service purchased such as an image of the purchased product, textual or multimedia content generated by the purchaser as part of the online purchase, etc.) that is attached or appended to or otherwise provided in association with the request.

In those embodiments in which the content is included in or otherwise provided in conjunction with the request, the service provider system may store the content in one or more local datastores that form at least part of the service provider system. The local datastores may or may not be co-located with one or more servers forming part of the service provider system. Alternatively, the service provider system may direct one or more server devices to store the content in one or more remote datastores. More specifically, the service provider system may transmit the content to the one or more server devices along with an instruction/request for the server device(s) to store the content in the remote datastore(s). As will be described in more detail hereinafter, the service provider system may subsequently retrieve or access the content by submitting a request for the content to the server device(s). In still other embodiments, the service provider system may store at least a portion of the content in the local datastore(s) and direct storage of at least a portion of the content in the remote datastore(s). For example, a portion of the content may be stored in the local datastore(s) and a remaining portion of the content may be stored in the remote datastore(s). Alternatively, multiple instances of the content may be stored to provide redundancy, where one or more instances of the content are stored in the local datastore(s) and one or more instances of the content are stored in the remote datastore(s).

In various other embodiments, the request associated with the financial transaction may include an identifier that facilitates access to and retrieval of the content associated with the financial transaction rather than the content itself. For example, the request may include an identifier that specifies a location at which the content is stored. In certain embodiments, the service provider system may utilize the identifier provided with the request to obtain or retrieve the content. Upon retrieval of the content, the service provider system may proceed to store the content locally in the one or more local datastores, or alternatively, may direct storage of the content in the remote datastore(s) as described earlier.

In an example embodiment, a user may access a client application and provide user input to the client application that indicates a desire to send a payment to recipient such as, for example, a P2P payment. Upon receipt of the user input, the client application may display a user interface screen that includes fields for specifying the recipient of the payment, a payment amount, a desired transaction date (e.g., a desired speed of the transaction), and so forth. Upon receiving additional user input corresponding to the fields noted above, the client application may prompt the user for a network location where content (e.g., image content) corresponding to the P2P payment is stored. For example, the client application may display a user interface screen that includes a field for specifying a content location identifier (e.g., a URL) that identifies a network resource storing the content. Upon receiving user input indicative of the content location identifier, the client application may present a user interface screen that provides confirmation of receipt of the P2P payment request and may submit a payment message to the service provider system. The payment message may include the payment information and the content location identifier. The service provider system may then retrieve the content using the content location identifier and generate a payment instruction (e.g., a debit instruction and/or a credit instruction) that includes the payment information, the content location identifier, and optionally, at least a portion of the content.

In those example embodiments in which the financial transaction request includes the content to be associated with the financial transaction, the requestor who submits the financial transaction request may specify a network resource where the service provider system is to store the content. For example, the user may specify, via a user interface of a client application used to submit the financial transaction request, a network resource address (e.g., a URL) of a network resource at which the service provider system is to store the content. The network resource may be personal network storage associated with the requestor (or an account holder on whose behalf the financial transaction request is submitted), in which case, the request may include authentication credentials for accessing the network resource. In certain example embodiments, the service provider system may access the network resource using authentication credentials received as a result of the requestor logging into a client application to submit the financial transaction request. In those example embodiments in which the service provider system stores the content in personal network storage specified by the requestor, the service provider system may also store the content in one or more local datastores or request one or more server devices to store the content in one or more remote datastores.

Upon receipt of the content, either with the financial transaction request or by retrieving the content using an identifier provided with the request, the service provider system may analyze the content to determine whether it may contain any explicit material not suitable for distribution. For example, one or more content filters may be applied to the content to identify and restrict content that does not meet certain criteria. Any suitable software application, tool, or the like may be used to scan user-specified content and filter the content based on content filter(s). For example, text included in the content may be searched using one or more text-based or phonetic algorithms to attempt to locate one or more predetermined prohibited keywords or phrases. The text that is scanned may include textual content specified by the user, text identified in an image using optical character recognition (OCR) or a similar character recognition technique, or the like. As previously described, the service provider system may first utilize an identifier included in the financial transaction request to retrieve the content prior to applying the content filter(s) to the content. Upon determining that the content is acceptable, the service provider system may identify a content location identifier that facilitates access to the content associated with the financial transaction. In some embodiments, the service provider system may generate the content location identifier, while in other embodiments a system, device, or program module(s) distinct from the service provider system may generate the content location identifier. If generated by a system, device, or module(s) distinct from the service provider system, the content location identifier may be obtained, received, or retrieved by the service provider system from the entity that generates the content location identifier. In those embodiments in which the request includes an identifier that identifies a location where the content is stored, that identifier may correspond to the content location identifier identified by the service provider system. Alternatively, the service provider system may utilize the identifier provided with the request to access and retrieve the content, store the content in the local datastore(s) or direct storage of the content in the remote datastore(s) upon receipt of the content, and proceed to generate a second identifier (e.g., the content location identifier) that serves to facilitate access to the content stored in the local datastore(s) and/or remote datastore(s).

The content location identifier may be any suitable identifier that facilitates access to and retrieval of the content. For example, the content location identifier may be a Uniform Resource Locator (URL) that references a resource where the content is stored (e.g., the local datastore(s) and/or the remote datastore(s)). In various embodiments, the content location identifier may be a shortened URL that is shorter than a longer URL that identifies a resource where the content is stored. The shortened URL may be generated from the longer URL and may redirect to the resource identified by the longer URL. The shortened URL may be generated in accordance with any suitable URL shortening methodology. For example, the shortened URL corresponding to a longer URL may be generated using an appropriate hash function that maps the longer URL to a unique key that may be used to generate the shortened URL. In some embodiments, as will be described in more detail hereinafter, the content location identifier may include a resource locator such as a shortened URL as well as anchor text or an indication of anchor text to be included in a presentation of information associated with a financial account that is debited or credited as part of the financial transaction. For example, financial account information presented via an online application interface may include the anchor text as a selectable representation of the content location identifier (e.g., a clickable hyperlink) that, upon selection, directs a user to the resource identified by the content location identifier.

Upon identification or generation of the content location identifier, the service provider system may generate a debit or a credit instruction associated with the financial transaction. The service provider system may embed, insert, or otherwise associate the content location identifier with the generated debit or credit transaction or append the content location identifier thereto and transmit the debit or credit instruction to a payment network or a financial institution at which a financial account associated with the financial transaction is held. The payment network to which the debit or credit instruction may be transmitted may be any suitable payment network including, but not limited to, an ACH network, such as that supported by the Federal Reserve or the Electronic Payments Network (EPN), a proprietary network of financial institutions, a debit network, a credit network, or any other suitable payment network capable of facilitating and/or processing financial transactions between member financial institutions or between member financial institutions and non-member financial institutions. In one or more embodiments, the payment network may be a real-time payment network. The payment network may include any number of computing devices, payment gateways, routers, switches, communicative links, and so forth that facilitate financial transactions between financial institutions.

Upon receipt of the debit or credit instruction, the payment network may cause a debit or credit to be posted to a financial account. The payment network may transmit or otherwise convey the debit or credit instruction via a set of communicative links to, for example, a core account processing system associated with the financial institution which, in turn, may cause a debit or credit to be posted to the financial account. Alternatively, the payment network, via a set of communicative links to the financial institution, may cause the debit or credit to be posted to the financial account.

In some embodiments, rather than transmitting the debit or credit instruction to a payment network, the service provider system may transmit the debit or credit instruction to a financial institution at which a financial account to be debited or credited as part of the financial transaction is held. For example, the service provider system may transmit the debit or credit instruction via a set of communicative links to one or more program modules configured to interact with a core account processing system of the financial institution. Upon receipt of the debit or credit instruction, the program module(s) may cause an associated debit or credit to be posted to the financial account, or alternatively, may direct the core account processing system to post the debit or credit to the financial account.

As previously described, the debit or credit instruction transmitted by the service provider system may include a content location identifier that facilitates access to content relating to the financial transaction, and may optionally further include information that may be included in a representation of the content location identifier. An online banking application or other online user interface may be configured to present information (e.g., transaction and account information) associated with the financial account. Such online account information may include an indication of the posting of the debit or credit to the financial account. The presentation of information may further include a representation of the content location identifier. For example, as previously described, the content location identifier may be a shortened URL that redirects to a longer URL that identifies a resource where the associated content is stored.

In some embodiments, the content location identifier itself (e.g., the shortened URL) may be displayed as part of the presentation of information. In other embodiments, an alternate representation of the content location identifier may be displayed. For example, anchor text associated with the content location identifier may be displayed. The anchor text may include, for example, text that is generally descriptive of the nature/type of content with which the content location identifier is associated. The anchor text may have been provided along with the content location identifier in connection with the debit or credit instruction. In other embodiments, a key or other identifier that identifies the anchor text to display may have been supplied with the debit or credit instruction. In still other embodiments, the representation of the content location identifier may be an image such as an icon that is representative of the content or the type of content, a thumbnail image of the content itself, or the like. It should be appreciated that numerous other representations of the content location identifier are within the scope of this disclosure and may be presented.

In still further embodiments, variable free-form content may be provided in association with the content location identifier. The variable content may be distinct from anchor text which, as described earlier, may be presented as a representation of the content location identifier. The variable content may be, for example, a character string (e.g., an access code) that may be presented in association with the representation of the content location identifier, and which provides access to the content upon selection of the representation of the content location identifier and redirection to a resource where the content is stored. It should be appreciated that numerous other examples of variable content associated with the content location identifier and distinct from the content identified by the content location identifier are within the scope of this disclosure.

As used herein, the phrase "representation of the content location identifier" may refer to the content location identifier itself or to some other representation associated with the content location identifier. For example, the "representation of the content location identifier" may refer to the content location identifier (e.g., a URL that includes a combination of alphanumeric characters), anchor text displayed as part of a hyperlink associated with the content location identifier, and so forth. In various embodiments, the representation of the content location identifier included in the presentation of information may be selectable. For example, the content location identifier displayed as part of an online presentation of information associated with the financial account may be hyperlinked or otherwise selectable. In other embodiments, anchor text associated with the content location identifier may be hyperlinked or otherwise selectable. Selection of the representation of the content location identifier may initiate a process for access and retrieval of content stored at a location referenced by the content location identifier.

In some embodiments, the online presentation of information provided by way of the online financial application may not include a selectable representation of the content location identifier. Rather, in certain embodiments, the content location identifier (e.g., a URL) may be displayed but may not be selectable, in which case, it may be necessary for a user to copy and paste the content location identifier into, for example, a browser field to initiate a process for accessing and retrieving the associated content. In the online context, the content location identifier may not be selectable if presented, for example, as part of a downloadable online account statement.

In other embodiments, the transaction and account information associated with the financial account that is debited or credited may be presented as part of a paper statement that may be mailed to an account holder on a periodic basis. The paper statement may include a representation of the content location identifier (e.g., the content location identifier itself) or a representation of the content referenced by the content location identifier. As will be described in more detail hereinafter, upon receipt of the content location identifier provided in connection with the debit or credit instruction, the financial institution (or more specifically an online financial application associated with the financial institution) may utilize the content location identifier to access and retrieve associated content. Upon receipt of the content, a representation of the content may be generated and presented in the paper statement. Alternatively, the representation of the content may itself be received by the online financial application. The representation of the content may be displayed in the paper statement in relative proximity to other transaction information associated with the financial transaction with which the content is associated. As a non-limiting example, the content may be an image of an individual from whom funds were received as part of a P2P payment. The representation of the content that is generated and displayed in the paper statement may be a thumbnail image of the original image.

Referring again to the online context, as previously noted, a selectable representation of the content location identifier (e.g., a hyperlink) may be presented as part of an online presentation of financial account information. Upon selection of the representation of the content location identifier, a request for the content may be generated. In certain embodiments, the request may be directed to one or more server devices configured to access and retrieve the content from one or more remote datastores. The server device(s) may transmit the content to the requesting application (e.g., the online financial application) for presentation to a user of the requesting application. For example, the content may be presented in a pop-up window overlaying the online application interface presenting the financial account information. Alternatively, the content may be presented in a new browser window or a new browser tab separate from a browser window or tab in which the financial account information is rendered. In still other embodiments, a dedicated software application may be accessed and opened for presenting the content such as, for example, when the content is multimedia content.

In other embodiments, the request for the content may be redirected to the service provider system. Upon receipt of the request for the content, the service provider system may access the local datastore(s) to retrieve the content, or alternatively, if the content is stored in the remote datastore(s), may re-transmit the request or generate and submit another request for the content to the server device(s) that may control access to the remote datastore(s). Upon receipt or retrieval of the content, the service provider system may generate a representation of the content which may include altering the content in some fashion. For example, the service provider system may compress, partition, or otherwise modify the content to conform to specifications of the online financial account application to which the modified content may be transmitted. In other embodiments, the service provider system may transmit the content to the online financial account application in unadulterated form. Upon receipt of the content, the online financial account application may modify the content according to various specifications prior to presenting the content to a user. Selection of the selectable representation of the content location identifier may cause the online financial account application to receive or retrieve the content and control the presentation of the content to a user. Alternatively, selection of the representation of the content location identifier may cause the user (e.g., the browser via which the user is accessing the financial account application) to be redirected to a resource hosted by the service provider system (or an alternate resource) such that the server provider system may control presentation of the content to the user.

As previously noted, in certain example embodiments of the disclosure, the service provider system may generate content for association with a financial transaction. For example, a requestor may submit a request for a financial transaction (e.g., a P2P payment, a request for a P2P payment, an online bill payment, etc.) using any suitable client application as described above. The service provider system may generate content relevant to the financial transaction and may store the content in personal network storage of the requestor or in one or more local datastores of the service provider system. Additionally, or alternatively, the service provider system may request/instruct one or more server devices to store the content in one or more remote datastores. The service provider system may further include at least a portion of the content in a debit and/or a credit instruction. The service provider system may transmit the debit and credit instructions to one or more financial institutions via one or more payment networks. The number and size of available data fields in the debit and/or credit instruction for including the content may vary based on the message format of the type of debit/credit instruction, as determined by a communication standard/protocol used to transmit the instructions. For example, certain communication standards (e.g., a financial transaction standard used to transmit a debit or credit instruction to a real-time payment network such as a proprietary network of financial institutions) may provide a large enough data allocation (e.g., anywhere in the range of 4K to 1 MB bytes of data allocation) within the instruction to allow for the entire content payload to be included in the instruction. Other example financial transaction standards (e.g., International Standard for Organization (ISO) 8583) may provide a more limited data allocation (e.g., 99 bytes in the Extended Data 3 Field (125) of the ISO 8583 specification) for the content such that the entire content cannot be included in the instruction. Stated another way, depending on the message format of the type of transaction message, one or more data fields (which may be of fixed length or variable length with an upper threshold) that are available in the transaction message may or may not be suitable for inclusion of the entire content payload. The number and size of available data fields for including the content may vary based on the financial institution.

In addition to optionally including at least a portion of the content in the debit or credit instruction, a content location identifier may also be inserted in the instruction. The content location identifier may point to a resource where the content is stored. A system that receives the debit or credit instruction (e.g., a back-end financial institution core account processing system) may use the content location identifier to retrieve the content. In certain example embodiments in which the entire content payload is included in the debit or credit instruction, the content location identifier may nonetheless be included as part of the content payload. In this manner, a system receiving the instruction may retrieve the content from the instruction itself or may use the content location identifier to retrieve the content from a network resource referenced by the content location identifier. In certain example embodiments, the fields of a credit/debit instruction may not be visible to a recipient of a financial transaction. However, a selectable representation of the content location identifier included in the credit/debit instruction may be presented to the recipient via, for example, an online banking interface to enable retrieval of the content by the recipient. Further, in certain example embodiments, content retrieved using the content location identifier may be formatted in a format that is more suitable for processing by a system that receives the credit/debit instruction than content included in the instruction itself. In addition, in those example embodiments in which the entire content payload cannot be included in the instruction, the receiving system may retrieve the portion of the content included in the instruction and may utilize the content location identifier to retrieve a remainder of the content from the network resource referenced by the content location identifier.

The content payload may include a set of data fields, with each data field comprising a portion of the content payload. At least one data field in the content payload may receive a Boolean value that specifies whether the message includes the entire content or whether some portion of the content needs to be retrieved using a content location identifier specified in the content payload. The content location identifier may be any suitable identifier including, but not limited to, a URL, a shortened URL, a non-URL identifier, and so forth. In certain example embodiments, a system that receives the debit or credit instruction, may make a call to a Web service. The receiving system may then provide the Web service with a non-URL identifier that is included in the credit/debit instruction in order to retrieve content corresponding to the non-URL identifier. A URL for accessing the Web service may have been previously provided to the receiving system.

In certain example embodiments of the disclosure, any of the requestor of a financial transaction, the service provider system that executes the financial transaction, or the receiver of a financial transaction (e.g., the recipient of funds transferred as part of a financial transaction) may specify content to be associated with the financial transaction. It should be appreciated that in certain example embodiments, the receiver of a financial transaction may be the same as the requestor such as, for example, if the financial transaction request is a request to request a P2P payment. An entity that identifies content for association with a financial transaction may also be provided with a capability to specify permissions that indicate which one or more entities are permitted to access the content. For example, a payor can set permissions for content that he/she associated with a payment request. Similarly, the service provider system may set permissions for content that it generates. In addition, a recipient may set permissions for content that it associates with a financial transaction request. For example, a merchant may specify permissions for remittance data generated or otherwise associated with a financial transaction by the service provider system. Example scenarios in which permissions may be set include, without limitation, P2P payments to multiple recipients that provide the same content but where only a subset of the recipients can view the content, a P2P payment associated with an image of the recipient where the image is viewable by the payor but not the recipient, content generated by the service provider system that is not viewable by the recipient (e.g., digital categorization information), and so forth.

In an example embodiment of the disclosure, a requestor may submit an online bill payment request. For example, the requestor may access a financial institution's online banking interface and submit a request for a payment to be made towards a loan issued by the financial institution. Upon receiving the loan payment request, the service provider system may generate content relating to the financial transaction. In certain example embodiments, the content may be remittance data that may include, for example, the account number of the loan to which the payment is to be applied, identifying information for the holder of the loan (e.g., first name, last name, address, etc.), the payment amount, other information pertinent to the payment (e.g., an additional principal payment), and so forth. A portion of the remittance data may be captured from the bill payment request, while other portion(s) of the remittance data may be independently obtained by the service provider system. For example, one or more portions of the remittance data (e.g., a payment amount, a payment date, a portion of the payment amount to be applied as additional payment towards the principal, etc.) may be captured from the bill payment request, while other portion(s) of the remittance data (e.g., a payor name, a payor address, a payor account number, etc.) may be obtained from other sources. The service provider system may then combine the various portions of the remittance data to obtain the remittance data that is referenced in a credit/debit instruction using a content location identifier inserted into the instruction, as described in more detail below.

The service provider system may generate a credit instruction and transmit the credit instruction to the financial institution via one or more payment networks. The credit instruction may be an instruction to credit a settlement account of the financial institution by an amount corresponding to the amount of the payment. The service provider system may also generate a debit instruction to debit a financial account of the loan holder (e.g., a demand deposit account) by the amount of the payment. The service provider system may insert the content (e.g., remittance data) into the debit and/or the credit instruction. A content location identifier may also be included in the instruction to permit retrieval of the content from a network resource storing the content. As previously noted, the entire remittance data may be included in the instruction if a sufficient amount of data allocation is available. In other scenarios, only a portion of the remittance data may be included in the instruction (or no portion of the remittance data may be included in the instruction), and a system receiving the instruction may utilize the content location identifier to retrieve all or a remainder of the remittance data. The remittance data/information generated by the service provider system and optionally included in a debit or credit instruction is distinct from transaction data included in the instruction that may be used to effectuate a financial transaction (e.g., post a debit or credit to a corresponding financial account). Rather, the remittance data/information may be remittance advice that may be used by a system that receives the debit or credit instruction (or by another system) to, for example, update one or more data records corresponding to the financial account or one or more other accounts related to the financial account.

In certain example embodiments, a financial institution's core account processing system may receive the credit instruction and may post a credit to a settlement account of the financial institution in the amount of the payment. The core account processing system may further retrieve remittance data from the instruction and/or from a network resource using a content location identifier included in the instruction, and may communicate the remittance data to an accounts receivable system of the financial institution. In certain example embodiments, the core account processing system of the financial institution may execute computer-executable instructions, code, or the like provided by the service provider to read the structured remittance data and call an Application Programming Interface (API) of the accounts receivable system. In certain other example embodiments, the service provider system itself may provide the remittance data to the accounts receivable system via a call to an API associated with the accounts receivable system. Further, in certain example embodiments, a system that receives the credit instruction may make a call via an appropriate API to the service provider system to request at least a portion of the remittance data. The call may include the content location identifier included in the instruction. The service provider system may then retrieve the at least a portion of the remittance data using the content location identifier and provide the retrieve remittance data to the requesting system. In certain example embodiments, the remittance data may be stored in a structured data format capable of being interpreted by the receiving system. In other example embodiments, the remittance data may be stored in a format (e.g., a normalized format) that may not be capable of being interpreted by the receiving system. The service provider system may determine that the current format of the remittance data is not capable of being interpreted by the receiving system and may re-format the remittance data in accordance with another structured data format prior to transmission to the receiving system.

Using the remittance data, the accounts receivable system may update one or more data records corresponding to the loan to reduce the amount owed on the loan by the amount of the payment. Further, in those example embodiments in which the remittance data indicates additional detail regarding the payment (e.g., a payment of $X in excess of the amount due), the accounts receivable system may update corresponding data record(s) accordingly (e.g., reduce the principal owed on the loan by $X). The above-described processing may be possible because the remittance data may have a structured format capable of being interpreted by the financial institution's core account processing system and its accounts receivable system. In addition, a core account processing system that receives the debit instruction (which may be the same system that receives the credit instruction if the debit account is held at the same financial institution as the institution that issued the loan) may post a debit to a financial account of the loan holder.

In addition, in certain example embodiments, content generated by the service provider system may be viewable by various parties to a financial transaction such as an account holder of a financial account debited as part of the financial transaction and/or an account holder of a financial account credited as part of the financial transaction. Referring again to the illustrative example in which the content generated by the service provider system is remittance data, the remittance data may be viewable in an online banking interface or the like accessed by the payor. In certain example embodiments, the content location identifier or a selectable representation thereof may be presented in an online banking interface, and an account holder (e.g., the payor in the example above) may select the identifier or the representation thereof to retrieve the remittance data. Further, in certain example embodiments, a financial institution system may analyze the content to determine one or more product or service offerings that can be made to an account holder of the financial institution. For example, assuming that a payor purchased a product and a merchant selling the product associates content (e.g., an image of the product, textual content containing product specifications, etc.) with the purchase transaction, the financial institution that receives a debit instruction associated with the purchase transaction may analyze the content to identify an offering for insurance or a warranty on the purchased product that may be made to the payor (who may be an account holder of the financial institution).

In addition, in certain example embodiments, the content location identifier may enable retrieval of a visual representation of remittance data. For example, selection of the content location identifier or a selectable representation thereof may cause a request to be transmitted to the service provider system. A system that receives the content location identifier (or a user of such a system) may be prompted to select whether the remittance data formatted in accordance with a structured data format is being requested or whether a visual representation of the structured remittance data is being requested. The request may specify the user's selection. If a visual representation is being requested, the service provider system may obtain the remittance data from a network resource identified by the content location identifier, generate the visual representation of the remittance data, and transmit the visual representation to the requesting system. Further in certain example embodiments, multiple content location identifier may be inserted into a debit or credit instructions. A first content location identifier may enable retrieval of structured data such as structured remittance data, while a second content location identifier may enable retrieval of a visual representation of the structured data.

It should be appreciated that the above example use case involving a "bank as biller" online bill payment scenario is merely illustrative and not exhaustive. The service provider system may generate content for association with any of a variety of types of financial transactions. For example, a payor may submit a bill payment request to pay an entity other than a financial institution. That entity may select a selectable representation of the content location identifier presented via a suitable interface to retrieve the corresponding content (e.g., structured remittance data). For example, a merchant system may execute computer-executable instructions, code, or the like (which may be provided to the merchant by the service provider) to enable retrieval of the content using the content location identifier. The merchant system may then provide the retrieved content to another system (e.g., an accounts receivable system) for processing. Further, in those example embodiments in which the service provider system generates, at least in part, content for association with a financial transaction, the content may include any of the types of content previously described including, but not limited to, textual content, image content (e.g., an image of a remittance coupon), multimedia content, structured data (e.g., remittance data), and so forth. In certain example embodiments, the content generated by the service provider system may include a computer-generated image of a check or a remittance coupon where no corresponding physical check or remittance coupon is available. In addition, as described earlier in connection with example embodiments in which the requestor of the financial transaction or some other entity specifies the content, a content location identifier that references a network resource storing content generated by the service provider system, a representation of the content location identifier, and/or a representation of the content itself may be presented to the requestor of the financial transaction and/or a recipient of funds transferred as part of the transaction via, for example, an online banking interface. Still further, a financial institution's core account processing system, accounts receivable system, or the like, a system (e.g., a payee's accounts receivable system) associated with the recipient of funds transferred as part of the transaction, or a system (e.g., a payor's accounts payable system) associated with an entity disbursing funds as part of the transaction are merely example systems that may be capable of receiving content in the form of structured data and using the content to update one or more account records relating to the financial transaction.

In certain other example embodiments, the service provider system may be configured to link multiple related financial transactions together. More specifically, the service provider system may be configured to populate a data field in a debit or credit instruction with an alphanumeric string or other data that indicates a type of transaction to which the debit or credit instruction relates. The debit or credit instruction may further include an alphanumeric identifier (e.g., a transaction ID) corresponding to another transaction to which the debit or credit instruction relates. For example, if a credit instruction corresponds to a refund or reversal of a previous financial transaction, the credit instruction may be include a label (e.g., an alphanumeric string in a designated data field) that identifies it as such. The credit instruction may further include a transaction ID of the previous financial transaction that is being reversed. The label and the transaction ID of the previous financial transaction may be used to group the transactions—the previous financial transaction and the reversal transaction—together in an online banking presentation.

These and other embodiments will now be described in more detail through reference to the accompanying drawings which form part of this disclosure. While various illustrative networked architectures and user interfaces for facilitating various illustrative methods of the disclosure are described, it should be appreciated that numerous modifications, alternatives, and expansions of the described illustrative embodiments fall within the scope of this disclosure.

Illustrative Architectures, Data Flows and Processes

FIG. 1A schematically depicts an illustrative networked architecture 100 for facilitating the presentation of content relating to a financial transaction in accordance with one or more embodiments of the disclosure. It should be appreciated that numerous other suitable networked configurations beyond the illustrative configuration depicted in FIG. 1A are within the scope of this disclosure. FIG. 2 schematically depicts an illustrative service provider computer 106 in accordance with one or more embodiments of the disclosure. The illustrative data flows depicted in FIGS. 1B-1D and the illustrative methods depicted in FIGS. 3-5 will be described through reference to the illustrative networked configuration shown in FIG. 1A and the illustrative service provider computer 106 depicted in FIG. 2.

The illustrative networked architecture 100 may include a service provider system 104 that may include one or more service provider computers 106(1)-106(N) (generically referred to herein as service provider computer(s) 106) and one or more local datastores 108, which may or may not be co-located with the service provider computer(s) 106. The networked architecture 100 may further include one or more payment networks 110, one or more server devices 112(1)-112(N) (generically referred to herein as server device(s) 112) that may control access to and retrieval of information stored in one or more remote datastore(s) 114, and a financial institution system 116 associated with one or more financial institutions and which may include one or more financial institution computers 118(1)-118(N) (generically referred to herein as financial institution computer(s) 118).

The service provider computer(s) 106, the financial institution computer(s) 118, and/or the server device(s) 112 may include any suitable computing device including, but not limited to, a server computer, a mainframe computing device, a workstation computing device, a personal computing device, and so forth. It should be appreciated that the service provider system 104 and/or the financial institution system 116 may further include various other components such as routers, gateways, switches, other computing devices, communicative links, or any other suitable components.

A client device 102 that hosts or otherwise provides access to a client application 102A is also depicted in FIG. 1A. As will be described in more detail later in this disclosure, the service provider system 104 may receive a request associated with a financial transaction from the client application 102A. Although not depicted in FIG. 1A, one or more intervening systems or devices may be provided between the client device 102 and the service provider system 104. For example, the client device 102 may represent a user device and an intervening payee system may be provided that submits payment requests on behalf of a user of the client device 102 (e.g., a payor). In various embodiments, the client application 102A may be a thin client such as, for example, a browser-based or dedicated mobile application that is hosted by one or more remote servers that may form part of the service provider system 104 or another system or entity.

In addition, a user interface 120 may be provided that is hosted by the financial institution system 116. The user interface 120 may include a representation of a content location identifier 122 that identifies a location where content associated with a financial transaction is stored. The user interface 120 and the content location identifier 122 will also be described in greater detail later in this disclosure.

FIG. 2 depicts an illustrative service provider computer 106 in accordance with one or more embodiments of the disclosure. The service provider computer 106 may comprise one or more processors 202 and one or more memories 204 (generically referred to herein as memory 204). The processor(s) 202 may include any suitable processing unit capable of accepting digital data as input, processing the input data based on stored computer-executable instructions, and generating output data. The computer-executable instructions may be stored, for example, in the memory 204 and may include operating system software, application software, and so forth. The processor(s) 202 may be configured to execute the computer-executable instructions to cause various operations to be performed. The processor(s) 202 may include any type of processing unit including, but not limited to, a central processing unit, a microprocessor, a Reduced Instruction Set Computer (RISC) microprocessor, a microcontroller, an Application Specific Integrated Circuit (ASIC), and so forth.

The memory 204 may store program instructions that are loadable and executable by the processor(s) 202, as well as data manipulated and generated by the processor(s) 202 during execution of the program instructions. Depending on the configuration and implementation of the service provider computer(s) 106, the memory 204 may be volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 204 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The service provider computer 106 may further include additional data storage 218 such as removable storage and/or non-removable storage including, but not limited to, magnetic storage, optical disk storage, and/or tape storage. Data storage 218 may provide non-volatile storage of computer-executable instructions and other data. The memory 204 and/or the data storage 218, removable and/or non-removable, are examples of computer-readable storage media (CRSM).

The service provider computer 106 may further include communications connection(s) 222 that allow the service provider computer 106 to communicate with other computing devices or application software forming part of the networked architecture 100 depicted in FIG. 1A. For example, the service provider computer 106 may utilize the communications connection(s) 222 to communicate with the client application 102A, the payment network(s) 110, the financial institution system 116 (e.g., the financial institution computer(s) 118), the server device(s) 112, and so forth.

The service provider computer 106 may additionally include one or more input/output (I/O) devices 220, such as a keyboard, a mouse, a pen, a voice input device, a touch input device, a display, speakers, a camera, a microphone, a printer, and so forth, for receiving user input and/or providing output to a user.

The memory 204 may include various program modules comprising computer-executable instructions that upon execution by the processor(s) 202 cause the service provider computer 106 to perform various operations. For example, the memory 204 may have loaded therein an operating system (O/S) 206 that provides an interface between other application software executing on the service provider computer 106 and hardware resources of the service provider computer 106. More specifically, the O/S 206 may include a set of computer-executable instructions for managing hardware resources of the service provider computer 106 and for providing common services to other application programs (e.g., managing memory allocation among various application programs). The O/S 206 may include any operating system now known or which may be developed in the future including, but not limited to, a Microsoft Windows® operating system, an Apple OSX™ operating system, Linux, Unix, a mainframe operating system such as Z/OS, a mobile operating system, or any other proprietary or freely available operating system.

The memory 204 may further include a database management system (DBMS) 208 for accessing, retrieving, storing, and/or manipulating data stored in one or more datastores. The DBMS 208 may use any of a variety of database models (e.g., relational model, object model, etc.) and may support any of a variety of query languages.

The memory 204 may further include various program modules comprising computer-executable instructions that upon execution by the processor(s) 202 cause the service provider computer 106 to perform various operations. The functionality provided by these various program/application modules will be described in more detail hereinafter through reference to various accompanying drawings.

Figure 2:
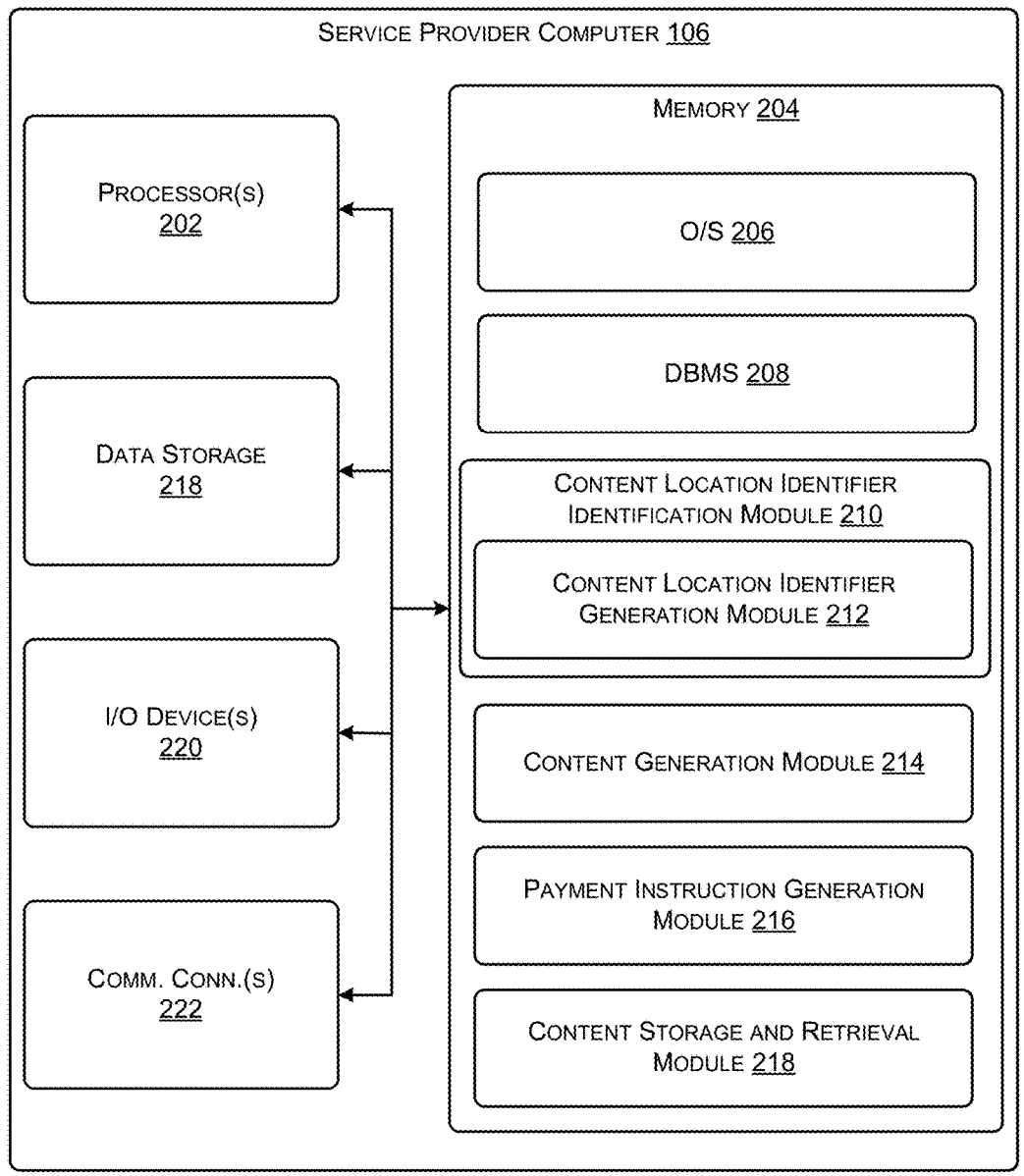
FIG. 2 schematically depicts an illustrative device for facilitating presentation of content relating to a financial transaction in accordance with one or more embodiments of the disclosure.
Figure 3:
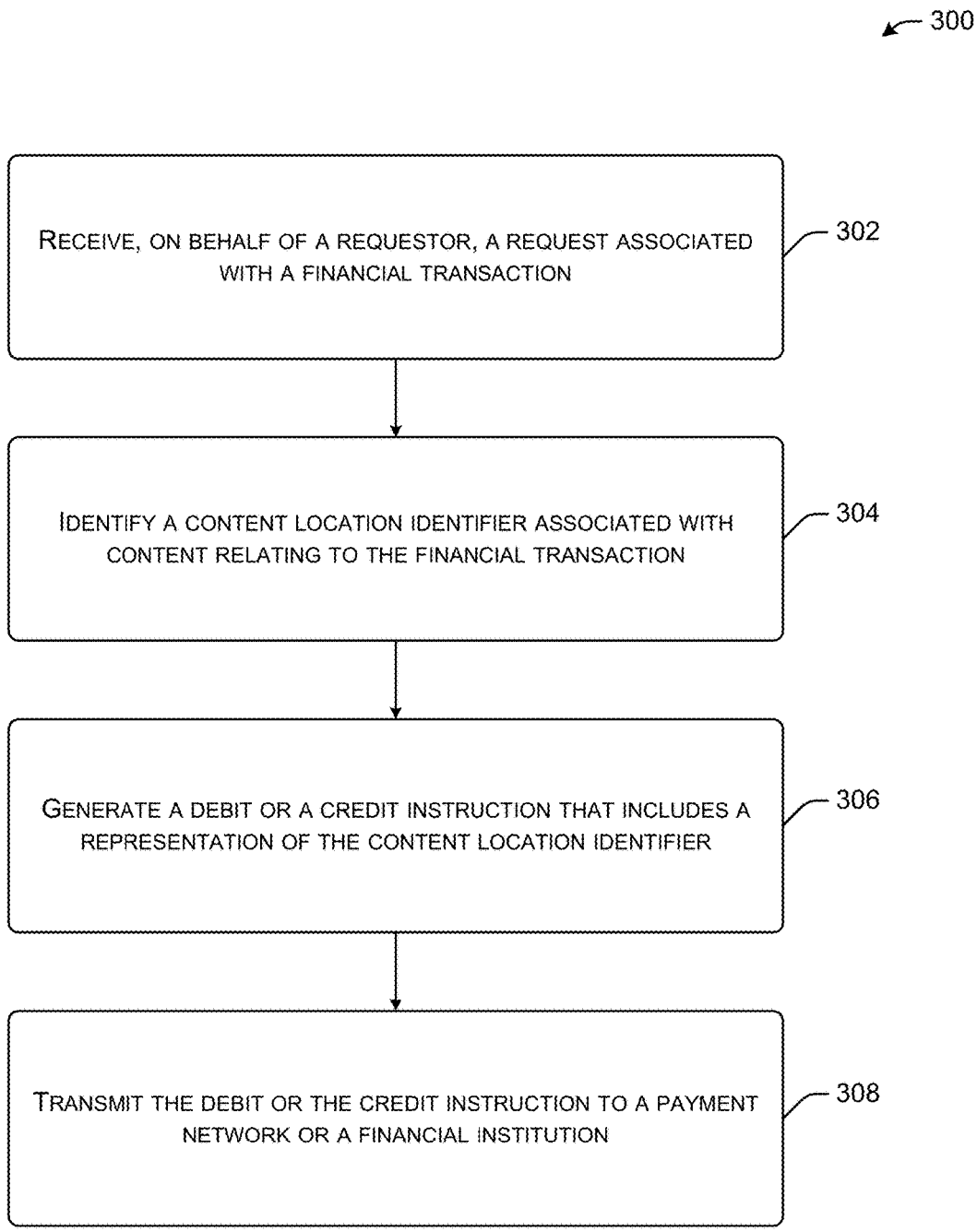
FIG. 3 is a process flow diagram depicting an illustrative method for identifying a content location identifier associated with content relating to a financial transaction and including the content location identifier in a debit or credit instruction associated with the financial transaction in accordance with one or more embodiments of the disclosure.
Figure 4:
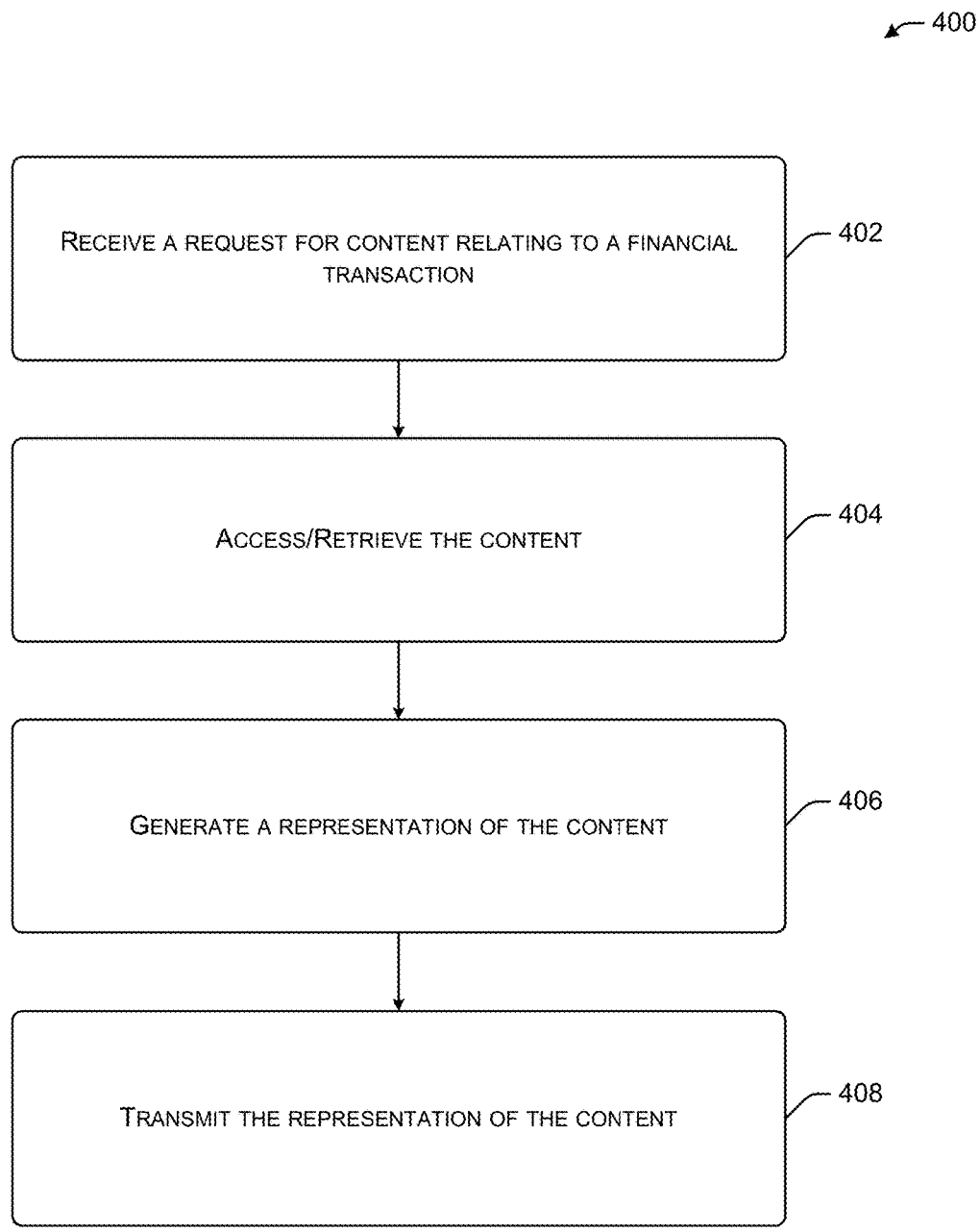
FIG. 4 is a process flow diagram depicting an illustrative method for receiving a request for content relating to a financial transaction and generating and transmitting a representation of the content in accordance with one or more embodiments of the disclosure.
Figure 5:
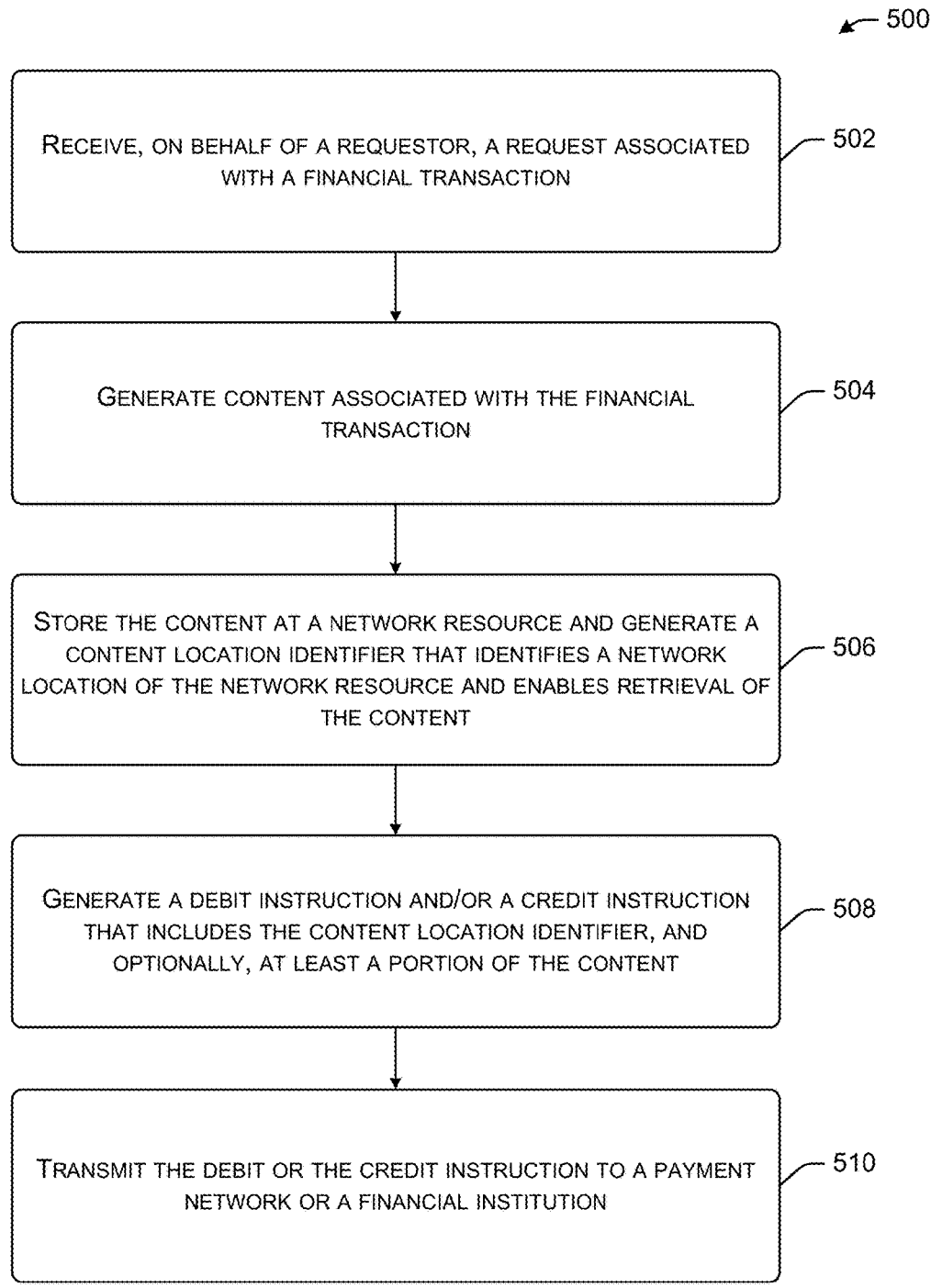
FIG. 5 is a process flow diagram depicting an illustrative method for generating content relating to a financial transaction, storing the content at a network resource, generating a content location identifier that identifies a network location of the network resource, and inserting the content location identifier and optionally at least a portion of the content in a debit and/or credit instruction associated with the financial transaction in accordance with one or more embodiments of the disclosure.

FIG. 3 is a process flow diagram depicting an illustrative method 300 for identifying a content location identifier associated with content relating to a financial transaction and including the content location identifier in a debit or credit instruction associated with the financial transaction in accordance with one or more embodiments of the disclosure. FIG. 4 is a process flow diagram depicting an illustrative method 400 for receiving a request for content relating to a financial transaction and generating and transmitting a representation of the content in accordance with one or more embodiments of the disclosure. FIG. 5 is a process flow diagram depicting an illustrative method 500 for generating content relating to a financial transaction, storing the content at a network resource, generating a content location identifier that identifies a network location of the network resource, and inserting the content location identifier and optionally at least a portion of the content in a debit and/or credit instruction associated with the financial transaction in accordance with one or more embodiments of the disclosure. The illustrative methods 300-500 will be described through reference to the illustrative networked architecture depicted in FIG. 1A, the illustrative data flows depicted in FIGS. 1B-1D, and/or the illustrative configuration and implementation of a service provider computer 106 as depicted in FIG. 2. However, it should be appreciated that the illustrative methods 300-400 may be performed in connection with any networked architecture and configuration within the scope of this disclosure. Further, while various operations are depicted in the process flow diagrams depicted in FIGS. 3-5, it should be appreciated that any of the depicted operations are optional and that, in various embodiments, any of the operations may not be performed. Further, in various embodiments, additional operations may be performed beyond those which are depicted.

Figure 1B:
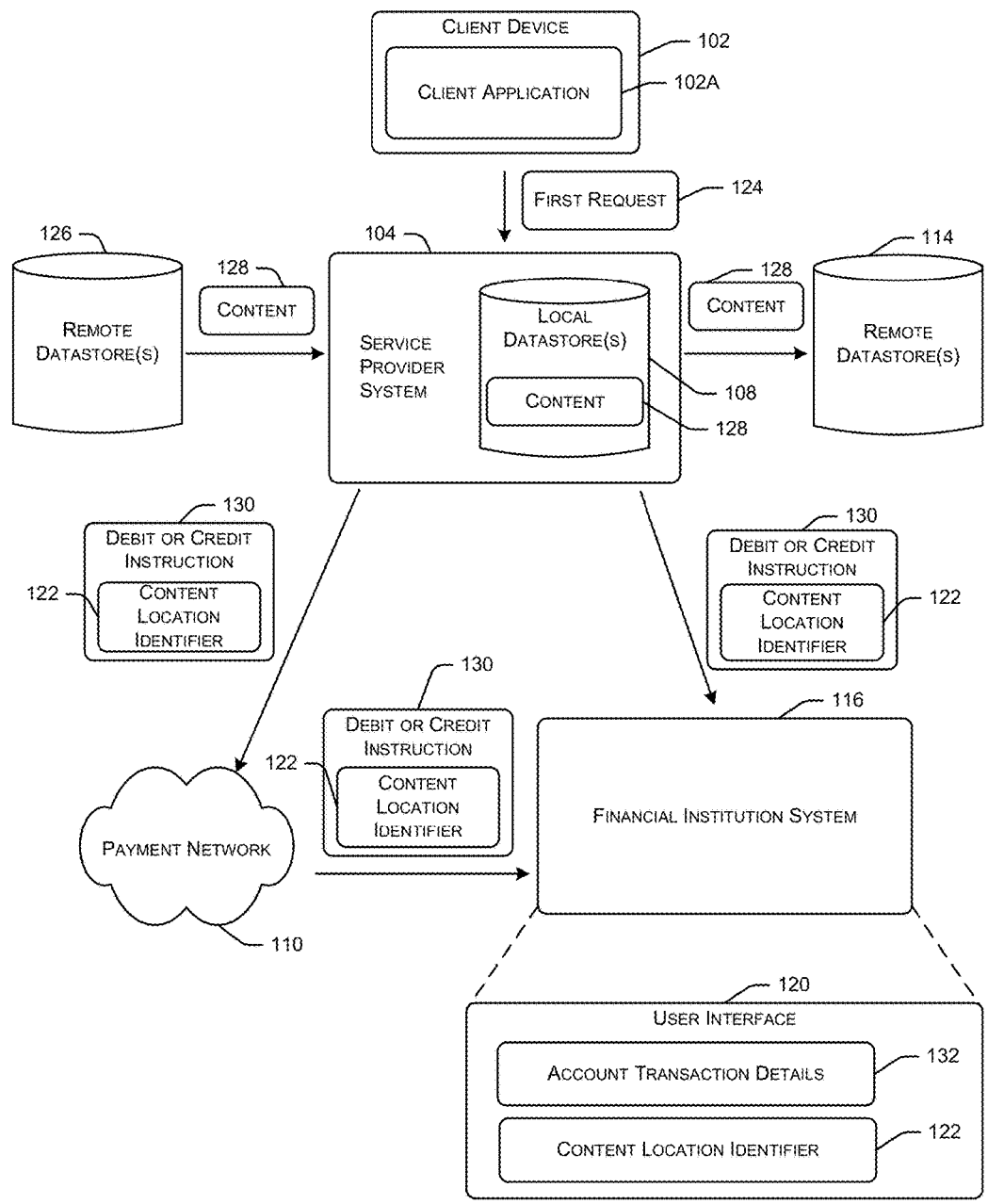
FIGS. 1B-1D schematically depict various illustrative data flows between various components of the illustrative architecture depicted in FIG. 1A in accordance with one or more embodiments of the disclosure.

Referring to FIG. 3 and through further reference to the illustrative architecture 100 depicted in FIG. 1A, the illustrative data flows depicted in FIG. 1B, and the illustrative service provider computer 106 architecture depicted in FIG. 2, at operation 302, the service provider system 104 may receive, via a set of communicative links, a request 124 associated with a financial transaction from a client application 102A hosted by a client device 102. The communicative links between the service provider system 104 and the client device 102 may form part of any of one or more communication networks including, but not limited to, one or more cable networks, the Internet, one or more wireless networks having any coverage area, cellular networks, peer-to-peer networks, or any other private and/or public networks. Further, such communicative links may provide for network traffic across any type of medium including, but not limited to, coaxial cable, twisted wire pair, optical fiber, hybrid fiber coaxial (HFC), microwave terrestrial transceivers, radio frequency communications, satellite communications, or combinations thereof.

The client device 102 may be any suitable device capable of hosting the client application 102A including, but not limited to, a server computer, a mainframe computer, a desktop computer, a laptop computer, a mobile device such as a smartphone, tablet device or other device with cellular capabilities, a personal digital assistant (PDA), a POS device, a gaming console, a set-top box, a smart television, or any other suitable device or combination thereof. The client application 102A may be any of the client applications previously described including, but not limited to, an online banking or other financial application, a person-to-person (P2P) client application, a funds transfer application, a client application that supports functionality for electronic bill presentment and payment, a client application that supports functionality for remote deposit capture, a toolkit that may include Application Programming Interfaces (APIs) or software libraries that may be used in the context of another client application to access functionality provided by the service provider system 104, and so forth. In certain embodiments, the client application 102A may be associated with an online merchant or other payee and may support functionality for receiving financial account information as input and initiating an online credit card transaction, an online debit card transaction, an ACH transaction, and so forth.

The service provider system 104 may be configured to receive the request 124 from the client application 102A via the set of communicative links that connect the client device 102 and the service provider system 104. The request 124 received by the service provider system 104 may be associated with any of a variety of types of financial transactions including, but not limited to, a bill payment, a person-to-person (P2P) payment, a request for a P2P payment, a retail payment, an account-to-account transfer, a funds transfer, a check deposit, and so forth.

Still referring to the illustrative architecture 100 depicted in FIG. 1A, the service provider system 104 may additionally be configured to communicate with the server device(s) 112, the financial institution system 116, and the payment network(s) 110 via respective sets of communicative links. The respective communicative links via which the service provider system 104 may communicate with the server device(s) 112, the financial institution system 116, and/or the payment network(s) 110 may form at least part of one or more communication networks which may be any of the types previously described. In certain embodiments, at least a portion of the communicative links via which any of the networked components of the illustrative architecture 100 are able to communicate may form part of one or more of the same networks.

The request 124 received by the service provider system 104 from the client application 102A may be associated with content 128 relating to the financial transaction. The content 128 may be provided with the request 124 (either embedded in the request or as an attachment thereto) or may otherwise be identified in the request 124 (e.g., an identifier that identifies a resource where the content 128 is stored may be provided in the request 124).

Upon receipt of the request 124, the service provider computer(s) 106 may store the associated content 128 in the local datastore(s) 108. As previously noted, the content 128 may be provided with the request 124, in which case, the service provider computer(s) 106 may identify the content 128 from the request 124 and proceed to store the content 128 in the local datastore(s) 108. For instance, the service provider computer(s) 106 may include a content storage and retrieval module 218 that comprises computer-executable instructions that upon execution by the processor(s) 202 causes the content 128 to be identified from the request and stored in the local datastore(s) 108. In certain embodiments, the processor(s) 202 may execute computer-executable instructions provided as part of the content storage and retrieval module 218 to call a service (e.g., a software service) to store the content in the local datastore(s) 108.

In various embodiments, the processor(s) 202 may optionally execute computer-executable instructions provided as part of the content storage and retrieval module 218 to direct storage of the content 128 in the remote datastore(s) 114 by transmitting the content 128 and a request/instruction to store the content 128 to the server device(s) 112. In some embodiments, a portion of the content 128 may be stored in the local datastore(s) 108 and a remaining portion of the content 128 may be stored in the remote datastore(s) 114, one or more copies of the content 128 may be stored in the local datastore(s) 108 and one or more copies of the content 128 may be stored in the remote datastore(s) 114, and so forth.

In those embodiments in which the request 124 includes an identifier that identifies a resource where the content 128 is stored rather than the content 128 itself, the processor(s) 202 may execute computer-executable instructions provided as part of the content storage and retrieval module 218 to access and retrieve the content 128 using the identifier provided with the request 124 and to store the content in the local datastore(s) 108 and/or direct storage of the content in the remote datastore(s) 114. For example, referring to FIG. 1B, computer-executable instructions included in the content storage and retrieval module 218 may be executed to access the one or more other remote datastore(s) 126 using the identifier provided with the request 124, retrieve the content 128 therefrom, and store the content in the local datastore(s) 108 and/or direct storage of the content in the remote datastore(s) 114. Although not depicted in FIG. 1B, the service provider system 104 may optionally retrieve the content 128 from the remote datastore(s) 126 by submitting a request to one or more server devices (not shown) that control access to the remote datastore(s) 126. The request 124 may also include authentication credentials for accessing the remote datastore(s) 126.

Further, in other example embodiments, the request 124 may specify a network resource where the service provider system 104 is to store the content. For example, the request 124 may specify a network resource address (e.g., a URL) of a network resource at which the service provider system 104 is to store the content. The network resource may be personal network storage associated with the requestor (or an account holder on whose behalf the financial transaction request is submitted), in which case, the request 124 may include authentication credentials for accessing the network resource. In certain example embodiments, the service provider system 104 may access the network resource using authentication credentials received as a result of the requestor logging into the client application 102A to submit the financial transaction request. In those example embodiments in which the service provider system 104 stores the content in personal network storage specified by the requestor, the service provider system 104 may also store the content in the local datastore(s) or direct storage of the content in the remote datastore(s) 114.

Referring again to FIG. 3, at operation 304, the processor(s) 202 may execute computer-executable instructions included in a content location identifier identification module 210 to identify (or generate) a content location identifier 122 associated with the content that identifies a resource where the content 128 is stored (e.g., the local datastore(s) 108 and/or the remote datastore(s) 114). For example, in certain embodiments, such as those in which the content is stored in the remote datastore(s) 114, the service provider computer(s) 106 may receive the content location identifier 122 from the server device(s) 112. Further, in those embodiments in which the request 124 does not include the content 128 but instead includes an identifier that identifies a location where the content 128 is stored, the content location identifier 122 may correspond to the identifier provided with the request 124. Alternatively, in certain of those embodiments in which the request 124 includes an identifier associated with the content 128 rather than the content 128 itself, the processor(s) 202 may execute computer-executable instructions included in the content location identifier identification module 210 and/or the content storage and retrieval module 218 to retrieve the content 128 from the resource (e.g., the remote datastore(s) 126) where the content 128 is stored using the identifier provided with the request 124, store or direct storage of the content 128 in the local datastore(s) 108 and/or the remote datastore(s) 114, respectively, and generate the content location identifier 122 or receive the content location identifier 122 from the server device(s) 112. In various embodiments, the processor(s) 202 may execute computer-executable instructions provided as part of the content location identifier generation module 212 to generate the content location identifier 122.

Referring again to FIG. 3, at operation 306, the service provider system 104 may generate a debit or credit instruction 130 associated with the financial transaction based on the request received at operation 302. For example, the processor(s) 202 may execute computer-executable instructions included in the payment instruction generation module 216 to generate the debit or credit instruction 130. The debit or credit instruction 130 may be generated in accordance with a standard that specifies various formatting requirements that the debit or credit instruction 130 must adhere to in order to provide for interoperability between various payment networks and financial institutions.

The content location identifier 122 identified (or generated) at operation 304 may comprise a content locator (e.g., a URL) that identifies a location where the associated content 128 is stored. In various embodiments, the content location identifier 122 may be a shortened URL capable of being included in a predefined field of the debit or credit instruction 130 that has a predetermined maximum limit on the size of data that may be included in the field. In certain embodiments, additional information may be provided along with the content location identifier 122 that may affect how the content location identifier 122 will be represented by, for example, an online financial application interface that presents transactional and account information associated with a financial account debited or credited as part of the financial transaction. For example, anchor text that is optionally descriptive of or relevant to the content identified by the content location identifier 122 may also be provided with the debit or credit instruction 130. An online application interface may display the anchor text, perhaps as a selectable hyperlink, in lieu of the content location identifier 122. The anchor text may be linked to the content location identifier 122 such that selection of the anchor text may cause a request to be generated for retrieval of the content 128 based on the content location identifier 122 that identifies a location where the content 128 is stored. In other embodiments, an indication of the anchor text (e.g., a key that identifies associated anchor text) may be included in the debit or credit instruction 130. In such embodiments, an online application interface having prior knowledge of the association between the key and the anchor text may identify the key provided in the debit or credit instruction 130, identify the associated anchor text, and display the anchor text, perhaps as a selectable hyperlink. Alternatively, the indication of the anchor text may cause a selectable graphic image to be presented in lieu of the anchor text such as, for example, a selectable icon or thumbnail image. In still further example embodiments, a non-URL content location identifier 122 may be inserted in the debit or credit instruction 130. The non-URL content location identifier 122 may enable retrieval of corresponding content 128 upon making a call to a Web service or the like using a URL identifier.

Referring again to FIG. 3, at operation 308, the service provider computer(s) 106 may transmit the generated debit or credit instruction 130 to the payment network(s) 110 or the financial institution system 116. For example, the processor(s) 202 may execute computer-executable instructions provided as part of one or more program modules stored in the memory 204 to transmit the generated debit or credit instruction 130. As previously described, the payment network(s) 110 may be any suitable payment network including, but not limited to, an ACH network, a proprietary network of financial institutions, a debit network, a credit network, or any other suitable payment network capable of facilitating and/or processing financial transactions between member financial institutions or between member financial institutions and non-member financial institutions. The payment network(s) 110 may include any number of computing devices, payment gateways, routers, switches, communicative links, and so forth that facilitate the processing of financial transactions between financial institutions.

Upon receipt of the debit or credit instruction 130, the payment network(s) 110 may cause a debit or credit to be posted to a financial account held at a financial institution associated with the financial institution system 116. The payment network(s) 110 may transmit or otherwise convey the debit or credit instruction 130, via a set of communicative links to, for example, the financial institution computer(s) 118 forming at least part of the financial institution system 116, or more specifically, to a core account processing system associated with or forming part of the financial institution computer(s) 118. The core account processing system may, in turn, cause a debit or credit to be posted to the financial account. Alternatively, the payment network(s) 110 may cause the debit or credit to be posted to the financial account via the set of communicative links to the financial institution system 116. It should be appreciated that the financial institution system 116 may be communicatively linked to multiple different types of payment networks (e.g., an ACH network, a proprietary financial institution network, a debit network, etc.) such that financial accounts held at a financial institution associated with the financial institution system 116 may be accessed via the different payment networks. Respective modules associated with each of the payment networks may be integrated with a common core account processing system associated with the financial institution to support communication between the different payment networks and the core account processing system.

In other embodiments, rather than transmitting the debit or credit instruction 130 to the payment network(s) 110, the service provider computer(s) 106 may transmit the debit or credit instruction 130 to the financial institution system 116. For example, the service provider computer(s) 106 may transmit the debit or credit instruction 130—via a set of communicative links between the service provider system 104 and the financial institution system 116—to one or more program modules configured to interact with the financial institution computer(s) 118, or more specifically, with a core account processing system associated with or forming part of the financial institution computer(s) 118. Upon receipt of the debit or credit instruction 130, the program module(s) may cause an associated debit or credit to be posted to the financial account, or alternatively, may direct the core account processing system to post the debit or credit to the financial account.

In one or more embodiments of the disclosure, the debit or credit posted to the financial account may be posted in real-time. Alternatively, the debit or credit instruction may be transmitted or processed asynchronously as part of a batch transaction. Settlement associated with the posted debit or credit may occur as part of a net settlement of financial transactions between financial institutions which may occur asynchronously as part of a batch transaction.

As previously described, the content location identifier 122 associated with content 128 relating to the financial transaction may be provided with the debit or credit instruction 130 generated and transmitted by the service provider system 104. The content location identifier 122 may be communicated to the financial institution computer(s) 118 via the payment network(s) 110 such as in those embodiments in which the service provider system 104 transmits the debit or credit instruction 130 including the content location identifier 122 to the payment network(s) 110. Alternatively, the service provider system 104 may communicate the content location identifier 122 to the financial institution computer(s) 118 as part of the debit or credit instruction 130 that is transmitted, in certain embodiments, to the financial institution system 116 via the set of communicative links between the service provider system 104 and the financial institution system 116.

It should be appreciated that the service provider system 104 and the financial institution system 116 may, in various embodiments, include numerous other components beyond those depicted such as additional computing devices, datastores, routers, switches, gateways, additional software components, and so forth. Further, while certain functionality may be described as being provided by the service provider computer(s) 106 or the financial institution computer(s) 118, such functionality may, in various embodiments, be provided by other components forming part of the service provider system 104 or the financial institution system 116 either independently of the service provider computer(s) 106 and/or the financial institution computer(s) 118 or in conjunction therewith. In addition, although the service provider system 104 is illustratively depicted in FIG. 1A as a single system, it should be appreciated that the service provider system 104 may comprise an architecture that includes multiple independent system(s) and/or payment gateways capable of communicating among one another to facilitate the processing of financial transactions. Further, the various sets of communicative links and associated communication network(s) connecting various networked components of the illustrative architecture 100 (e.g., the set of communicative links between the service provider system 104 and the financial institution system 116) may also provide for communication between any of the components forming part of such systems. In addition, data or information described as being generated, transmitted, or received by a system (e.g., the service provider system 104) may be generated, transmitted, or received by one or more components of the system (e.g., the service provider computer(s) 106) and vice versa.

In various embodiments, the service provider computer(s) 106 may provide functionality that forms part of a middle application layer of functionality between the client application 102A and the payment network(s) 110 that provide access to financial accounts. In such embodiments, the service provider system 104 may further include the client application 102A. Further, in various embodiments, one or more of the payment networks 110 may form part of the service provider system 104 and may, for example, correspond to a proprietary payment network associated with a service provider with which the service provider system 104 is associated. In other embodiments, the client application 102A may be provided as a stand-alone application that is distinct from but capable of interacting with the service provider system 104 and providing access to the functionality offered by the service provider system 104. Further, in various embodiments, the payment network(s) 110 may operate independently of the service provider system 104, but may provide the service provider system 104 with access to financial accounts held at various financial institutions that are members of the payment network(s) 110. In various embodiments, a core account processing system associated with the financial institution system 116 may also form part of the service provider system 104. In addition, in certain embodiments, the user interface 120 may form part of or be provided by the service provider system 104.

In various embodiments, the client application 102A may be capable of communicating with one or more of the payment network(s) 110 independently of the service provider system 104. For example, a payment network 110 may support a set of communicative links that allow the client application 102A to communicate with the payment network 110 independently of the service provider system 104 through, for example, pre-existing payment gateways.

Referring again to FIGS. 1A-1B, the content location identifier 122 may be presented as part of a presentation of financial account information provided by a user interface 120. It should be appreciated that the user interface 120 may include one or more user interfaces (e.g., web pages) that provide various functionality associated with a financial application such as an online banking application. It should further be appreciated that the user interface 120 may be provided as part of an online financial application accessed using a mobile device such as a smartphone or tablet device or as part of a dedicated mobile application. The financial application may be a software application running on the financial institution computer(s) 118, and may potentially be a distributed application. The user interface 120 may, in fact, be any suitable interface (e.g., an online banking interface) for providing financial account information to a user (e.g., an account holder of the financial account). The user interface 120 may provide various account transaction details 132 including posting dates of financial transactions, status indicators of financial transactions, available account balance information, category indicators that indicate categories of financial transactions or payees (e.g., charity payments, mortgage payments, payees that are charities, payees that are merchants, etc.), information relating to pending transactions, brief textual descriptions of financial transactions, and so forth. In various embodiments, the user interface 120 including the account transaction details 132 and the content location identifier 122 may be presented to a user upon receipt of suitable authentication credentials. For example, an online financial application may provide one or more interfaces for receiving authentication credentials (e.g., a username and password) from a user (e.g., an account holder of a financial account) and may authenticate the user prior to presenting the account transaction details 132 and the content location identifier 122.

Figure 1C:
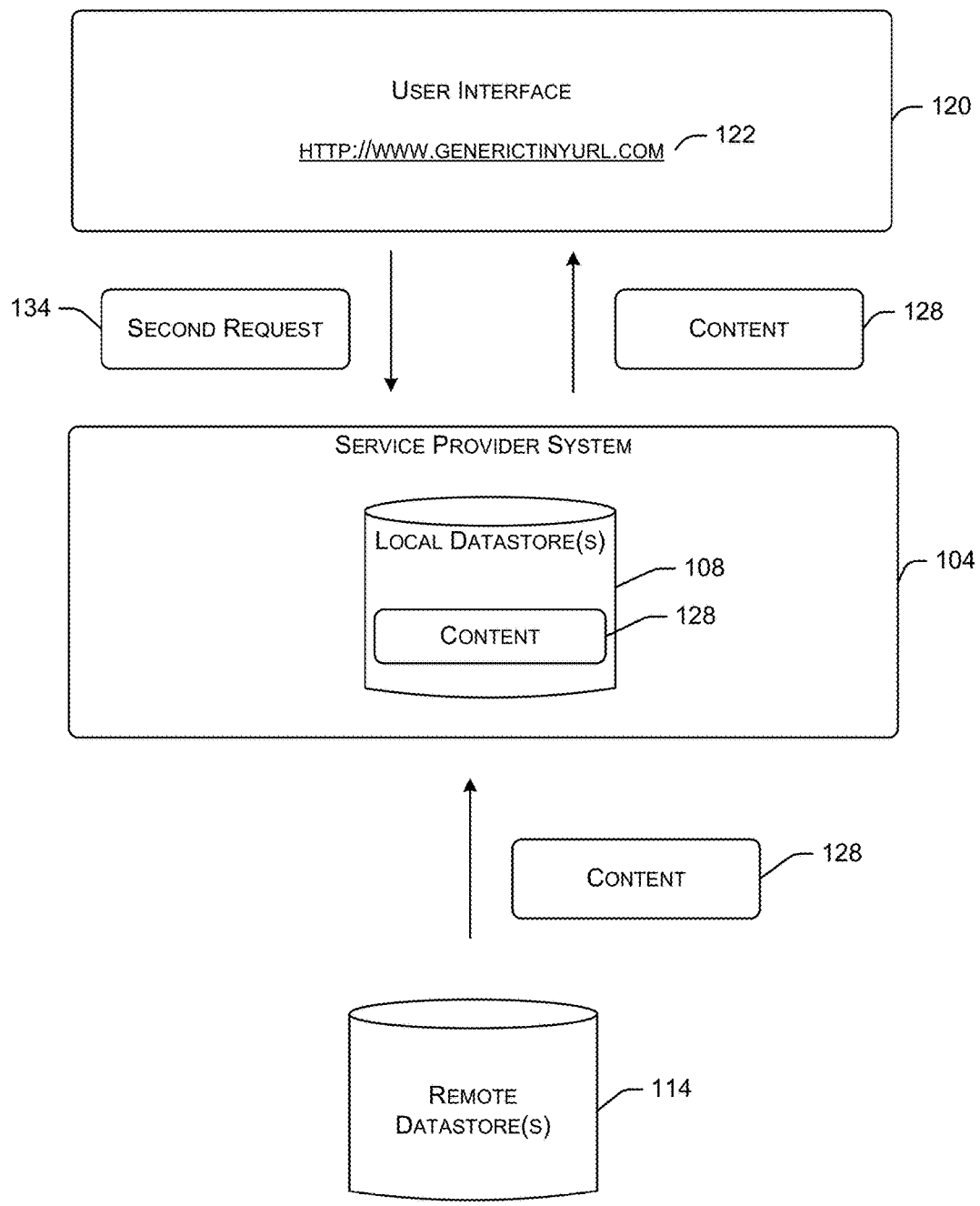
Figure 1D:
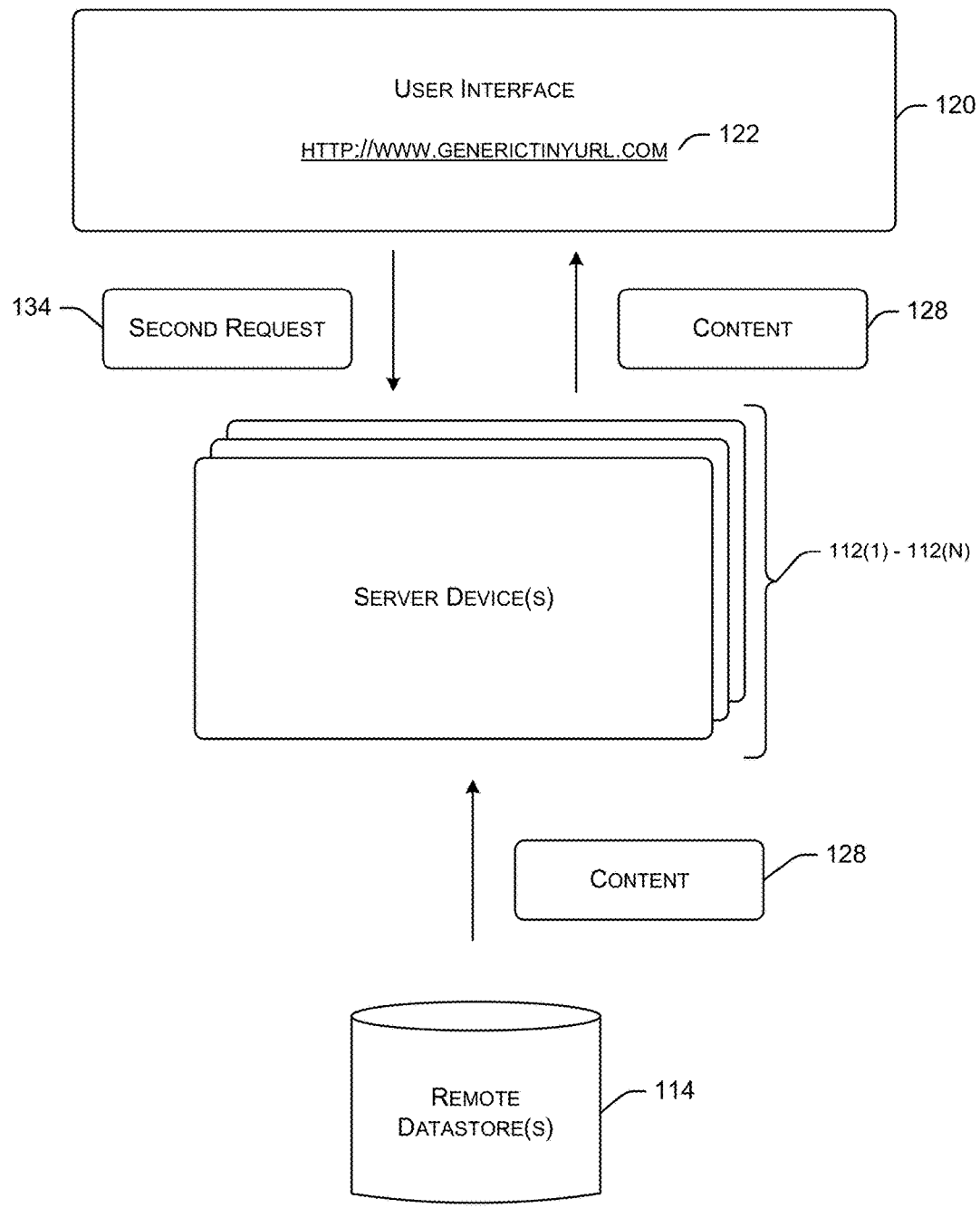

In certain embodiments, as depicted, for example, in FIGS. 1C and 1D, the content location identifier 122 may be presented as part of the presentation of information displayed to the user via the user interface 120. In other embodiments, an alternate representation of the content location identifier 122 may be presented such as, for example, anchor text that is linked to the content location identifier 122 and which is descriptive of or otherwise relevant to the content 128 referenced by the content location identifier 122. In various embodiments, the representation of the content location identifier 122 that is presented via the user interface 120 may be selectable. For example, the content location identifier 122, the anchor text representative of the content location identifier 122, and so forth may comprise a selectable hyperlink or some other selectable indicator. Upon selection of the selectable representation of the content location identifier 122 by, for example, an account holder of the financial account or other user of the user interface 120, a request for the content referenced by the content location identifier 122 may be generated. The request may be generated by, for example, the financial application with which the user interface 120 is associated. In certain embodiments, one or more other components of the financial institution system 116 may assist in generation of the request.

FIG. 4 is a process flow diagram that depicts an illustrative method 400 for receiving the request for the content 128 and generating and transmitting a representation of the content 128. The illustrative method 400 will be described first through reference to the illustrative data flows depicted in FIG. 1C and subsequently through reference to the illustrative data flows depicted in FIG. 1D.

Referring to FIGS. 1C and 4 in particular, at operation 402 of the illustrative method 400, the request 134 for the content 128 may be received by service provider system 104 from the user interface 120 (or more generally from a financial application providing the user interface 120). As previously described, the request 134 may be generated upon selection of the selectable representation of the content location identifier 122 provided as part of a presentation of information presented via user interface 120. Although the content location identifier 122 itself is depicted as being presented in FIG. 1C, it should be appreciated that an alternate representation of the content location identifier 122 (e.g., selectable anchor text) may be presented.

Upon receipt of the request 134, at operation 404, the service provider system 104, or more specifically one or more components thereof (e.g., the service provider computer(s) 106) may enforce access control to the content 128 by authenticating the received request. Authentication of the request may involve verification that the requestor of the content 128 is legitimately associated with the content 128 (e.g., the entity that identified the content or an entity acting on behalf of the entity that identified the content). The online financial account application may provide identifying information associated with the requestor of the content 128 based on a prior authentication of the content requestor by the financial account application. Alternatively, the service provider system 104 may require authentication credentials to be provided with the content request or may, if directly interacting with the content requestor, prompt for the authentication credentials.

Upon authentication of the content requestor, the service provider system 104 may retrieve the content 128. The content 128 (or at least a portion thereof) may be stored in the local datastore(s) 108 in which case the service provider computer(s) 106 may access the local datastore(s) 108 and retrieve the content 128 therefrom. Alternatively, the content 128 (or at least a portion thereof) may be stored in the remote datastore(s) 114. The service provider system 104 may have previously directed storage of the content 128 in the remote datastore(s) 114. The service provider computer(s) 106 may access the remote datastore(s) 114 and retrieve the content 128 therefrom. Although not depicted in FIG. 1C, it should be appreciated that, in various embodiments, the service provider computer(s) 106 may not have direct access to the remote datastore(s) 114. Rather, the service provider computer(s) 106 may transmit a request for the content 128 to the server device(s) 112 which may, in turn, access the remote datastore(s) 114, retrieve the content 128, and transmit the content to the service provider computer(s) 106. In various embodiments, the processor(s) 202 may execute computer-executable instructions provided as part of the content storage and retrieval module 218 to retrieve the content 128. Further, in those example embodiments in which the service provider system 104 has previously stored the content 128 in personal network storage associated with the financial transaction requestor, the service provider system 104 may utilize authentication credentials provided by the client application 102A to retrieve the content 128 in response to the request 134.

At operation 406, the service provider computer(s) 106 may generate a representation of the content 128. The representation of the content 128 that is generated may include the content 128 in unmodified form. Alternatively, the processor(s) 202 may execute computer-executable instructions provided as part of one or more program modules stored in the memory 204 to modify the content 128 by compressing, partitioning, or otherwise altering one or more characteristics of the content 128 to generate the representation of the content 128.

Figure 6:
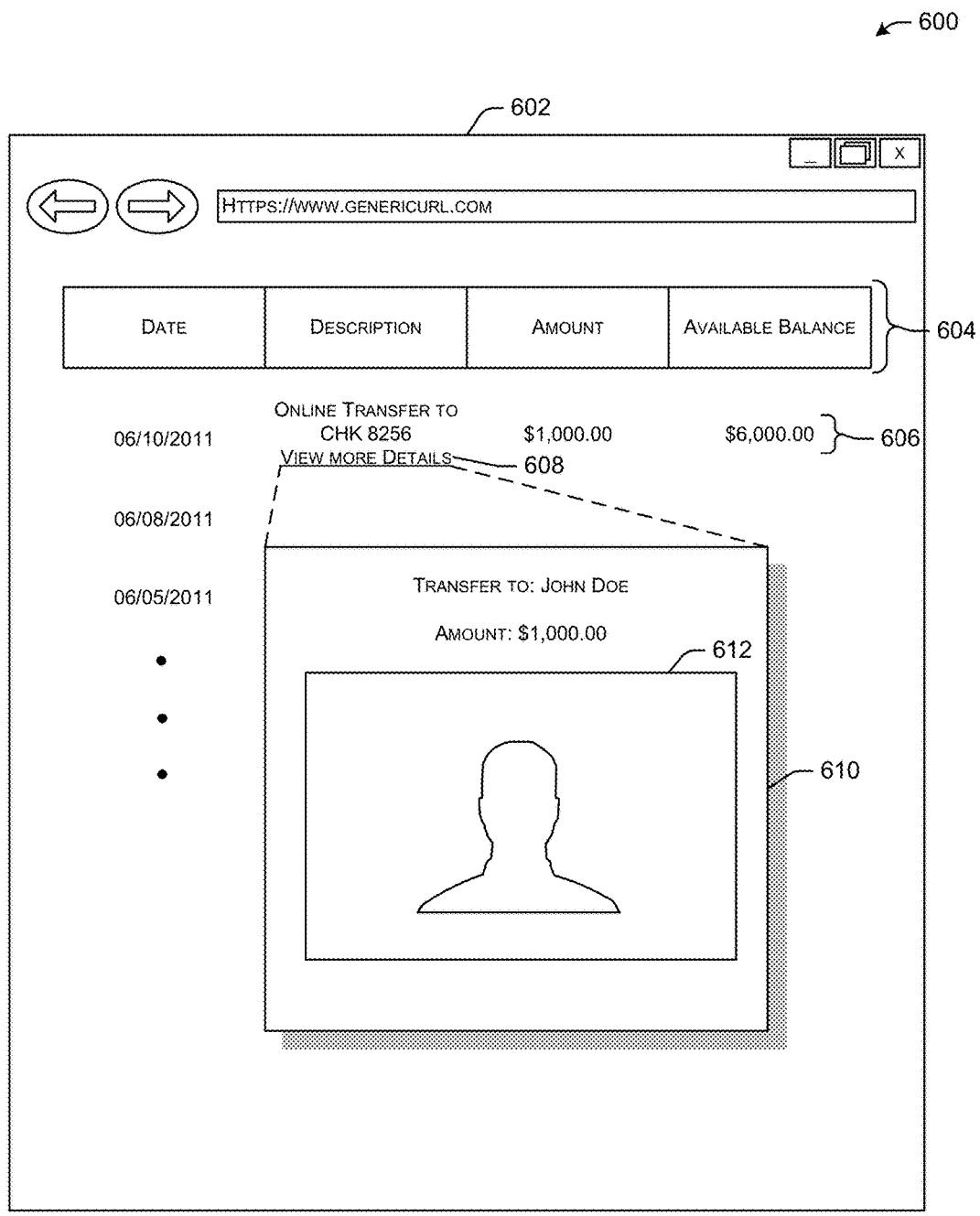
FIG. 6 depicts an illustrative online presentation of information associated with a financial account that includes a representation of a content location identifier that facilitates access to an illustrative type of content relating to a financial transaction in accordance with one or more embodiments of the disclosure.
Figure 7:
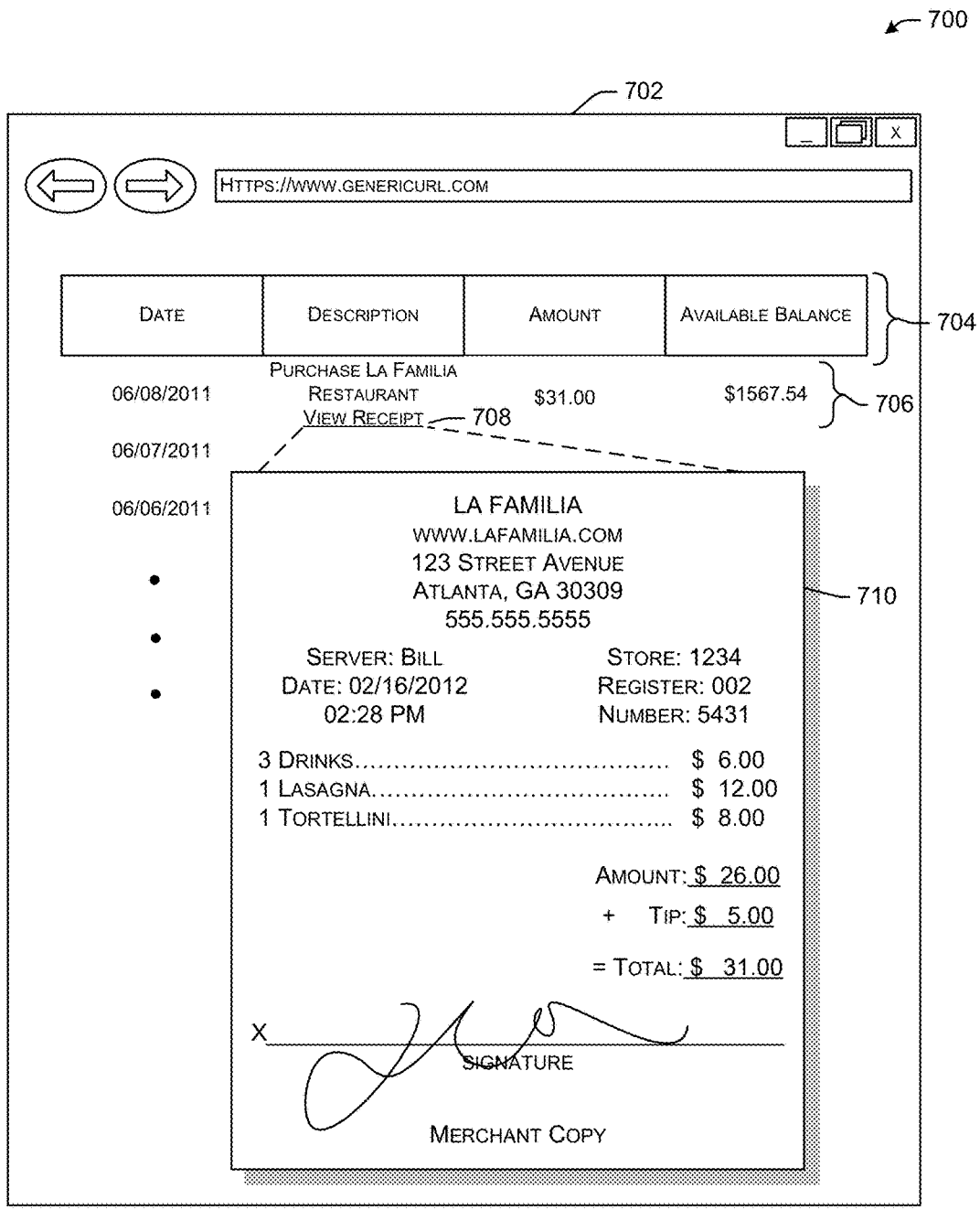
FIG. 7 depicts an illustrative online presentation of information associated with a financial account that includes a representation of a content location identifier that facilitates access to another illustrative type of content relating to a financial transaction in accordance with one or more additional embodiments of the disclosure.
Figure 8:
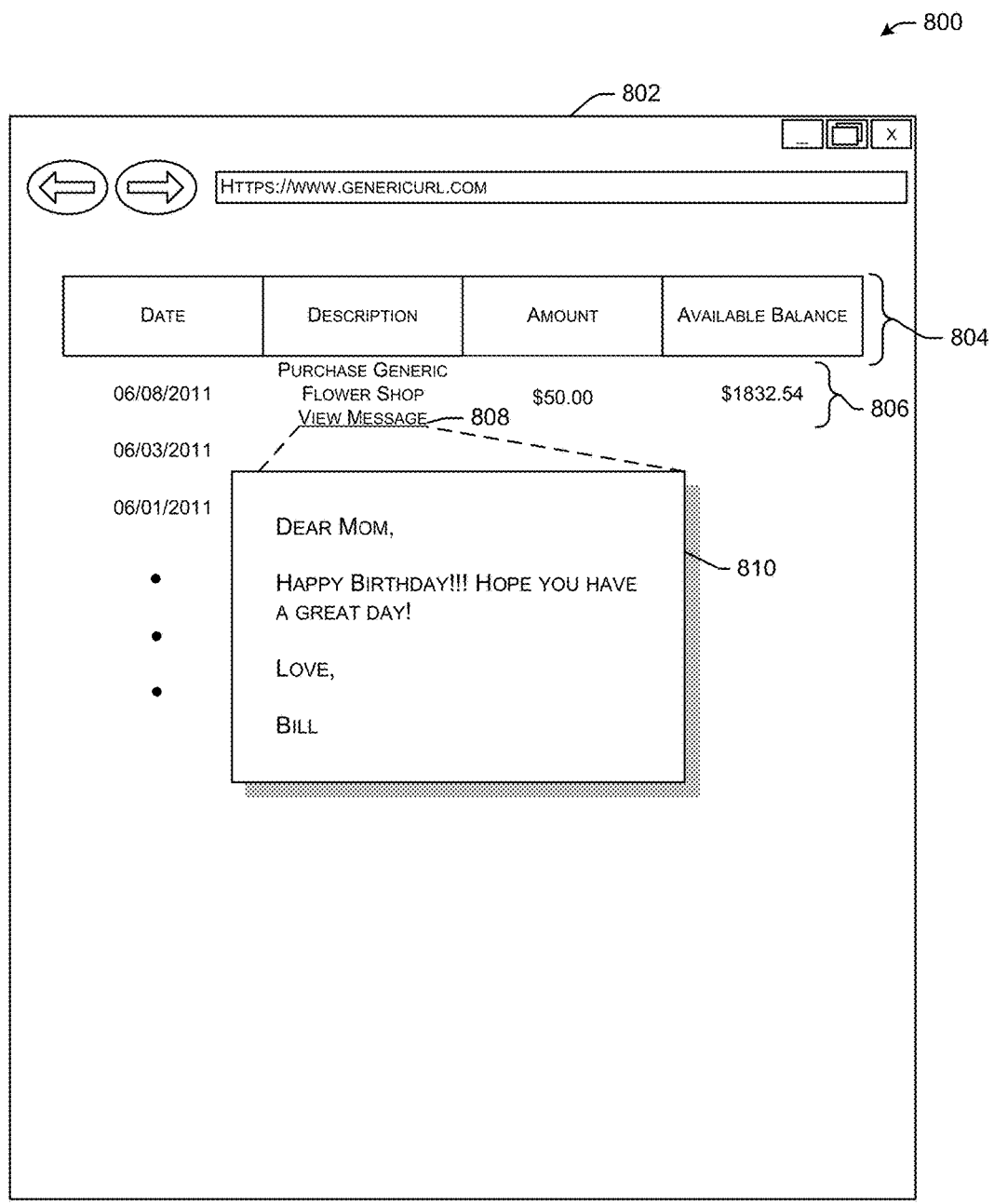
FIG. 8 depicts an illustrative online presentation of information associated with a financial account that includes a representation of a content location identifier that facilitates access to yet another illustrative type of content relating to a financial transaction in accordance with one or more embodiments of the disclosure.
Figure 9:
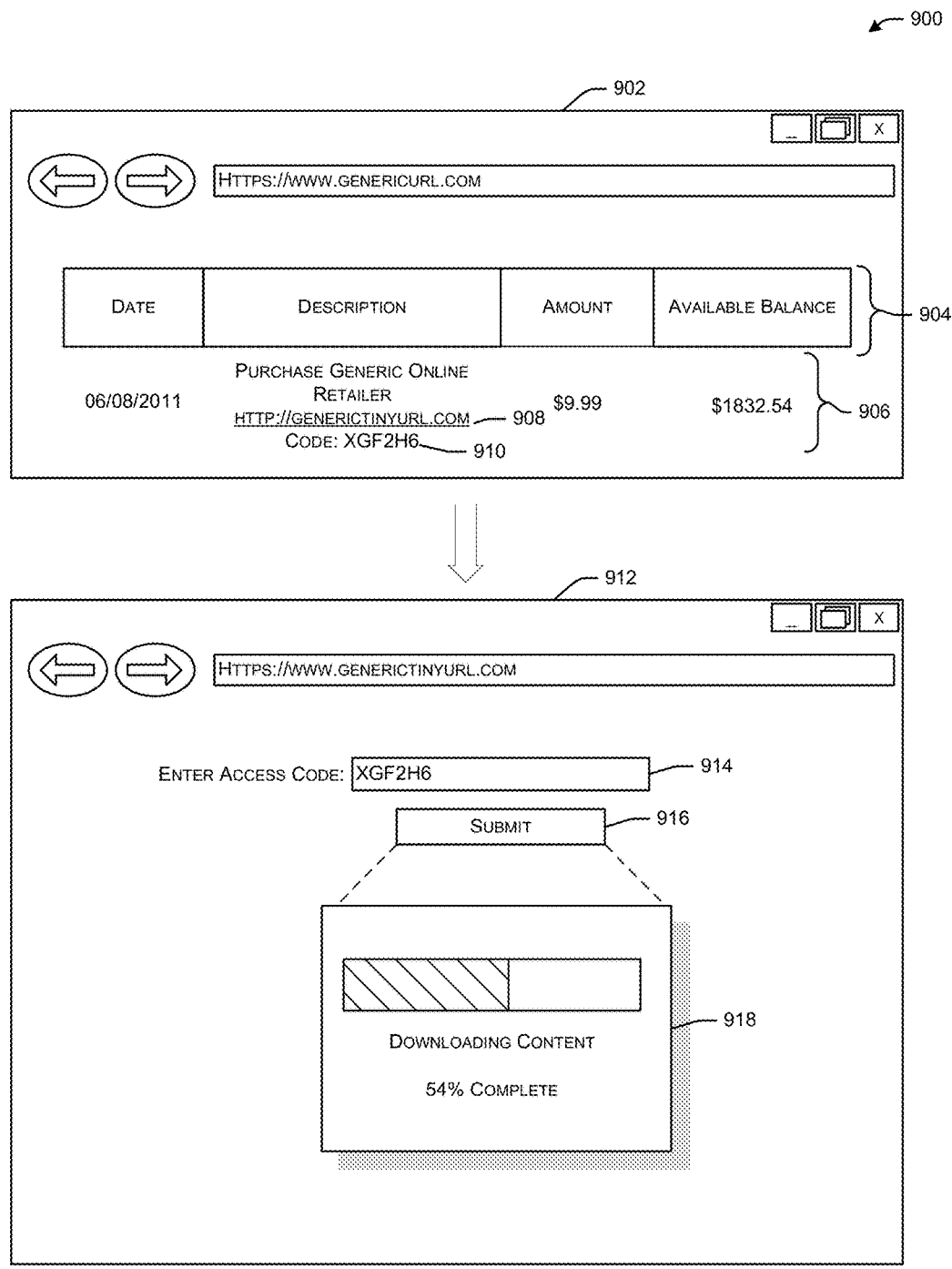
FIG. 9 depicts an illustrative online presentation of information associated with a financial account that includes a representation of a content location identifier and other information that facilitates access to yet another illustrative type of content relating to a financial transaction in accordance with one or more embodiments of the disclosure.

At operation 408, the service provider computer(s) 106 may transmit the representation of the content 128 to the user interface 120 for presentation to a user (e.g., an account holder). The representation of the content 128 may be presented in any of a variety of ways including as part of a pop-window generated by the user interface 120, as part of a new browser window or tab, or via a software application capable of supporting a format associated with the content 128 as in the case, for example, of various multimedia content. Various illustrative types of content 128 that may be presented to a user via the online user interface 120 are schematically depicted in FIGS. 6-8. In alternative embodiments, the representation of the content 128 received from the service provider computer(s) 106 by the user interface 120 may be presented as part of a printed paper statement as schematically depicted in FIG. 9. Upon receipt of the representation of the content 128, one or more components of the financial institution system 116 may optionally further modify the content 128 prior to presentation in a printed account statement.

Now referring to FIG. 4 in the context of the alternative illustrative data flows depicted in FIG. 1D, at operation 402 of the illustrative method 400, the request 134 for the content 128 may be received by the server device(s) 112 from the user interface 120 (or more generally from a financial application providing the user interface 120). As previously described, the request 134 may be generated upon selection of the selectable representation of the content location identifier 122 provided as part of a presentation of information presented via user interface 120. Although the content location identifier 122 itself is depicted as being presented in FIG. 1D, it should be appreciated that an alternate representation of the content location identifier 122 (e.g., selectable anchor text) may be presented.

Upon receipt of the request 134, the server device(s) 112 may access the remote datastore(s) 114 and retrieve the content 128 at operation 404. At operation 406, the server device(s) 112 may generate a representation of the content 128. The representation of the content 128 that is generated may include the content 128 in unmodified form. In such embodiments, the representation of the content 128 may correspond to the content 128 itself, and the server device(s) 112 may simply transmit the content 128 to the financial application providing the user interface 120 at operation 408. Alternatively, the server device(s) 112 may modify the content 128 by compressing, partitioning, or otherwise altering one or more characteristics of the content 128 to generate the representation of the content 128 and may transmit, at operation 408, the modified content to the financial application providing the user interface 120 for presentation to a user (e.g., an account holder). The representation of the content 128 may be presented in any of the variety of ways described earlier.

FIG. 5 is a process flow diagram depicting an illustrative method 500 for generating content relating to a financial transaction, storing the content at a network resource, generating a content location identifier that identifies a network location of the network resource, and inserting the content location identifier, and optionally, at least a portion of the content in a debit and/or credit instruction associated with the financial transaction in accordance with one or more embodiments of the disclosure. The method 500 will be described in conjunction with the illustrative networked architecture of FIG. 1A and the illustrative service provider computer 106 of FIG. 2.

At block 502, the service provider system 104 may receive, via a set of one or more communicative links, a request (e.g., the request 124) associated with a financial transaction from, for example, the client application 102A hosted by the client device 102. The request received by the service provider system 104 may be associated with any of a variety of types of financial transactions including, but not limited to, a bill payment, a person-to-person (P2P) payment, a request for a P2P payment, a retail payment, an account-to-account transfer, a funds transfer, a check deposit, and so forth.

At block 504, the service provider system 104 may generate content for association with the financial transaction. More specifically, computer-executable instructions of the content generation module 214 may be executed to generate the content. For example, in an example embodiment of the disclosure, the request received at block 502 may be an online bill payment request. Upon receiving the online bill payment request, computer-executable instructions of the content generation module 214 may be executed to generate remittance data that may include, for example, the account number of an account to which the payment is to be applied, identifying information for the account holder (e.g., first name, last name, address, etc.), the payment amount, other information pertinent to the payment (e.g., an additional principal payment being made for a loan), and so forth. A portion of the remittance data may be captured from the bill payment request, while other portion(s) of the remittance data may be independently obtained by the service provider system 104. For example, the remittance data may be generated from data included in the financial transaction request (e.g., payment amount, payment date, etc.), data associated with an application session during which the request is submitted (e.g., data that identifies the payor), and/or data stored in data repository accessible by the service provider system (e.g., a payee name, a payee address, an account number of the payor at the payee, etc.). The remittance data may be formatted in accordance with a format capable of being interpreted by a system associated with the payee (e.g., a core account processing system, an accounts receivable system, etc.).

At block 506, computer-executable instructions of the content storage and retrieval module 218 may be executed to store the content at a network resource and computer-executable instructions of the content location identifier generation module 212 may be executed to generate a content location identifier that identifies a network location of the network resource and enables retrieval of the content. The content may be stored in personal network storage associated with the requestor, in the local datastore(s) 108, and/or in the remote datastore(s) 114. The content location identifier may be any suitable identifier including, but not limited to, a URL, a shortened URL, a non-URL identifier, and so forth. The content may be stored in a neutral or normalized format and later transformed into a payee-desired format upon receipt of a request for the content from a payee system. As another example, the content may be stored in a payee-specific format determined based on preferences associated with the payee. An indication of the format of the content may be stored as part of the content or otherwise in association with the content. The format indication may inform the payee system of the format of the content, thereby allowing the payee system to parse the content.

At block 508, computer-executable instructions of the payment instruction generation module 216 may be executed to generate a debit and/or credit instruction corresponding to the requested financial transaction. At block 508, the content location identifier may be inserted in the debit and/or credit instruction. The content location identifier may point to the network resource where the content is stored. A system that receives the debit or credit instruction (e.g., a back-end financial institution core account processing system) may use the content location identifier to retrieve the content. Further, at block 508, the service provider system 104 may optionally further include at least a portion of the content in the debit and/or credit instruction. The number and size of available data fields in the debit and/or credit instruction for including the content may vary based on the message format of the particular communication standard/protocol used to transmit the instructions. For example, certain communication standards (e.g., a communication standard used to transmit a debit or credit instruction to a real-time payment network such as a proprietary network of financial institutions) may provide a large enough data allocation within the instruction to allow for the entire content payload to be included in the instruction. Other example communication standards (e.g., ISO 8583) may provide a more limited data allocation for the content such that the entire content cannot be included in the instruction.

In certain example embodiments in which the entire content payload is included in the debit or credit instruction, the content location identifier may nonetheless be included as part of the content payload. In this manner, a system receiving the instruction may retrieve the content from the instruction itself or may use the content location identifier to retrieve the content from a network resource referenced by the content location identifier. In addition, in those example embodiments in which the entire content payload cannot be included in the instruction, the receiving system may retrieve the portion of the content included in the instruction and may utilize the content location identifier to retrieve a remainder of the content from the network resource referenced by the content location identifier. In addition, the service provider system 104 may further specify one or more permissions that indicate which one or more entities are permitted to access the content. A permission may be specified by storing—in association with the content and/or the content location identifier—a code, identifier, label, or the like that has a predefined correspondence to a particular system or entity. For example, a first code may indicate that the financial transaction requestor is permitted to access the content, a second code may indicate that a recipient of funds transferred as part of the financial transaction is permitted to access the content, and so forth.

The content payload may include a set of data fields, with each data field comprising a portion of the content payload. At least one data field in the content payload may receive a Boolean value that specifies whether the message includes the entire content or whether some portion of the content needs to be retrieved using a content location identifier specified in the content payload. As previously noted, the content location identifier may be any suitable identifier including, but not limited to, a URL, a shortened URL, a non-URL identifier, and so forth. In those example embodiments in which the content location identifier is a non-URL identifier, a system that receives the debit or credit instruction may make a call to a Web service. The receiving system may then provide the non-URL identifier included in the instruction to the Web service in order to retrieve the content corresponding to the non-URL identifier. A URL for accessing the Web service may have been previously provided to the receiving system.

An example payment instruction that includes content generated by a service provider system (e.g., remittance data) and that is formatted in accordance with the ISO 8583 communication standard is shown below. Certain portions of the message content are bolded or italicized solely for ease of explanation.

125   ExtendedData3='000198000000000PP0001016 00020344111111111111112   0003030John   Doe 00040356000 Perimeter Dr 0005025Dublin 00060002OH 0007003840   72002012311400210912345678900220000000001000031041110032000000000001099-980'

The bolded portion of the example ISO 8583 message above may indicate a length (e.g., a number of bytes) of the remittance data that follows. A variety of identifiers or codes may be included in the remittance data. Each identifier may specify a type of data that follows the identifier. Each piece of data that follows a corresponding identifier may have a fixed or variable size. For example, the identifier 0020 may indicate that a payment due date follows the identifier; the identifier 0021 may indicate that an account number held by a payor with a payee (e.g., a remittance account number) follows the identifier; the identifier 0022 may indicate a payment amount; the identifier 0031 may indicate a sub-account number; and the identifier 0032 may indicate a payment amount to be applied towards the sub-account. A value that follows the identifier 9998 may be a Boolean value that indicates whether all content (e.g., all of the remittance data) is included in the ISO message. For example, a value of 0 may indicate the entire remittance data payload is included in the ISO message, while a value of 2 may indicate the entire remittance data payload is not included in the ISO message.

As previously noted, in certain example embodiments, a communication standard used to format the debit and/or credit instruction may provide a large enough data allocation to allow for the entire content payload to be included in the instruction. The content payload may be, for example, structured remittance data formatted in accordance with a suitable formatting scheme such as, for example, XML. An example of XML-formatted remittance data is provided below.

```
<?xml version="1.0"?>
<xs:schema
targetNamespace="http://checkfree.com/billerservices/paymentnotification/
input"
    xmlns:xs="http://www.w3.org/2001/XMLSchema"
    xmlns="http://checkfree.com/billerservices/paymentnotification/
    input"
    elementFormDefault="qualified">
<xs:simpleType name="FirstName">
  <xs:restriction base="xs:string">
    <xs:maxLength value="32" />
  </xs:restriction>
</xs:simpleType>
<xs:simpleType name="MiddleName">
  <xs:restriction base="xs:string">
    <xs:maxLength value="32" />
  </xs:restriction>
</xs:simpleType>
<xs:simpleType name="LastName">
  <xs:restriction base="xs:string">
    <xs:maxLength value="32" />
  </xs:restriction>
</xs:simpleType>
<xs:simpleType name="StreetAddress">
  <xs:restriction base="xs:string">
    <xs:maxLength value="30" />
  </xs:restriction>
</xs:simpleType>
<xs:simpleType name="City">
  <xs:restriction base="xs:string">
    <xs:maxLength value="24" />
  </xs:restriction>
</xs:simpleType>
<xs:simpleType name="State">
  <xs:restriction base="xs:string">
    <xs:length value="2" fixed="true" />
  </xs:restriction>
</xs:simpleType>
<xs:simpleType name="ZipCode">
  <xs:restriction base="xs:string">
    <xs:length value="5" fixed="true" />
  </xs:restriction>
</xs:simpleType>
<xs:simpleType name="ZipCode4">
  <xs:restriction base="xs:string">
    <xs:length value="4" fixed="true" />
  </xs:restriction>
</xs:simpleType>
<xs:simpleType name="BillNumber">
  <xs:restriction base="xs:string">
    <xs:maxLength value="25" />
  </xs:restriction>
</xs:simpleType>
<xs:simpleType name="MessageIdentifier">
  <xs:restriction base="xs:string">
    <xs:maxLength value="32" />
  </xs:restriction>
</xs:simpleType>
<xs:simpleType name="BillerIdentifier">
  <xs:restriction base="xs:string">
    <xs:maxLength value="32" />
  </xs:restriction>
</xs:simpleType>
<xs:complexType name="BillerName">
  <xs:sequence>
```

-continued

```
    <xs:element name="firstName" type="FirstName" />
    <xs:element name="middleName" type="MiddleName" minOccurs=
    "0" />
    <xs:element name="lastName" type="LastName" />
  </xs:sequence>
</xs:complexType>
<xs:complexType name="BillerAddress">
  <xs:sequence>
    <xs:element name="streetAddress1" type="StreetAddress" />
    <xs:element name="streetAddress2" type="StreetAddress" minOccurs=
    "0" />
    <xs:element name="city" type="City" />
    <xs:element name="state" type="State" />
    <xs:element name="zipCode" type="ZipCode" />
    <xs:element name="zipCode4" type="ZipCode4" minOccurs=
    "0" />
  </xs:sequence>
</xs:complexType>
<xs:element name="BillData">
  <xs:complexType>
    <xs:sequence>
      <xs:element name="messageIdentifier" type="MessageIdentifier" />
      <xs:element name="billerIdentifier" type="BillerIdentifier" />
      <xs:element name="name" type="BillerName" minOccurs=
      "0" />
      <xs:element name="address" type="BillerAddress" minOccurs=
      "0" />
      <xs:element name="billNo" type="BillNumber" />
    </xs:sequence>
  </xs:complexType>
</xs:element>
</xs:schema>
```

Still referring to FIG. 5, at block 510, the service provider system 104 may transmit the debit or credit instruction to a financial institution's system via one or more payment networks. Alternatively, the service provider system 104 may bypass a payment network and may transmit the debit or credit instruction to a financial institution's system via one or more dedicated communication links. In an example embodiment, the credit instruction may be an instruction to credit a settlement account of the financial institution by an amount corresponding to the amount of an online bill payment. Similarly, the debit instruction may be an instruction to debit a financial account of the account holder (e.g., a demand deposit account) by the amount of the payment. In certain example embodiments, a financial institution's core account processing system may receive the credit instruction and may post a credit to a settlement account of the financial institution in the amount of the payment. The core account processing system may further retrieve remittance data from the instruction and/or from a network resource using the content location identifier included in the instruction, and may communicate the remittance data to an accounts receivable system of the financial institution. In certain example embodiments, the service provider system 104 itself may provide the remittance data to the accounts receivable system via a call to an API associated with the accounts receivable system. Using the remittance data, the accounts receivable system may update one or more data records corresponding to the account being paid. Further, in those example embodiments in which the remittance data indicates additional detail regarding the payment (e.g., a payment of $X in excess of the amount due), the accounts receivable system may update corresponding data record(s) accordingly. The above-described processing may be possible because the remittance data may have a structured format capable of being interpreted by the financial institution's core account processing system and its accounts receivable system. Further, a core account processing system that receives the debit instruction (which may be the same system that receives the credit instruction if the debit account is held at the same financial institution as the institution that issued the account to which the payment is being directed) may post a debit to a financial account of the account holder.

In addition, in certain example embodiments, content generated by the service provider system may be viewable by various parties to a financial transaction such as an account holder of a financial account debited as part of the financial transaction and an account holder of a financial account credited as part of the financial transaction. Referring again to the illustrative example in which the content generated by the service provider system is remittance data, the remittance data may be viewable in an online banking interface or the like. In certain example embodiments, the content location identifier or a selectable representation thereof may be presented in an online banking interface, and an account holder may select the identifier or the representation thereof to retrieve the remittance data. The structured remittance data may be processed to generate a visual representation of the remittance data, and the visual representation may be presented in the online banking interface. It should be appreciated that while various program modules are illustratively depicted in FIG. 2 as being stored in the memory 204, numerous other program modules may be provided that include computer-executable instructions that, upon execution by the processor(s) 202, cause any of the operations described herein to be performed. Further, any functionality described as being provided by any of the program modules illustratively depicted in FIG. 2 may, in various embodiments, be performed, at least in part, by one or more other program modules.

Illustrative Interfaces

FIG. 6 depicts an illustrative online presentation of information 600 associated with a financial account that includes a representation of a content location identifier 608 that facilitates access to an illustrative type of content 612 relating to a financial transaction. The online presentation of information 600 may be provided via, for example, a browser window 602 displaying a web page associated with an online financial application or via any other suitable user interface. The presentation of information 600 may include various headings 604 that describe various aspects of financial transaction information provided to a user. For example, financial transaction information associated with an illustrative financial transaction 606 may include a posting date of the transaction, a brief textual description of the transaction, an amount of the transaction, an available balance remaining after posting of the transaction, and so forth.

A representation 608 of a content location identifier associated with content relating to a financial transaction may be presented. The representation 608 of the content location identifier may be presented in relatively close proximity to the financial transaction 606 with which it is associated. The example financial transaction 606 depicted in FIG. 6 may correspond, for example, to a P2P payment, a transfer of funds initiated via an online banking application, or a similar transaction. While anchor text is depicted as being presented in FIG. 6, it should be appreciated that any suitable representation 608 of the content location identifier (including the content location identifier itself) may be presented. As previously described, the representation 608 of the content location identifier may be selectable, and upon selection by a user, may initiate a process for retrieving the content from a resource identified by the content location identifier. The content 612 illustratively depicted in FIG. 6 includes an image of an individual to whom the P2P payment was made or to whom the funds were transferred. Additional textual content may be presented in association with the image (e.g., name of recipient of funds, transferred funds amount, etc.). This additional textual content may form part of the content initially identified by the requestor from whom the financial transaction request was received. For example, a client application via which the financial transaction request was submitted may provide functionality for associating various types of content (e.g., an image and associated textual content) to form aggregate content for association with the financial transaction. Alternatively, the image may correspond to the content identified by the requestor and the additional textual content may be identified and associated with the content identified by the requestor by the financial account application presenting the content to a user.

The content 612 is illustratively depicted as being presented in a pop-up browser window 610; however, any suitable mechanism for presenting the content 612 may be provided. The content 610 may have been identified/provided by an account holder associated with the financial account with which the presentation of information 600 is associated such as in the case of a P2P payment. Alternatively, the content 612 may have been identified/provided by the recipient of the funds such as in the case of a request for a P2P payment.

FIG. 7 depicts another illustrative online presentation of information 700 associated with a financial account that includes a representation 708 of a content location identifier that facilitates access to another illustrative type of content 710 relating to a financial transaction. The online presentation of information 700 may be provided via, for example, a browser window 702 displaying a web page associated with an online financial application or via any other suitable user interface. The presentation of information 700 may include various headings 704 similar to the headings 604 depicted in FIG. 6 that describe various aspects of the financial transaction information that is presented.

A representation 708 of a content location identifier associated with content relating to an illustrative financial transaction 706 may be presented. The representation 708 of the content location identifier may be presented in relatively close proximity to the financial transaction 706 with which it is associated. The example financial transaction 706 depicted in FIG. 7 may correspond, for example, to a retail purchase transaction or a similar transaction. While anchor text is depicted as being presented in FIG. 7, it should be appreciated that any suitable representation 708 of the content location identifier (including the content location identifier itself) may be presented. As previously described, the representation 708 of the content location identifier may be selectable, and selection by a user may initiate a process for retrieving the content from a resource identified by the content location identifier. The content 710 illustratively depicted in FIG. 7 is an image of a sales receipt associated with the financial transaction 706. The content 710 is illustratively depicted as being presented in a pop-up browser window; however, any suitable mechanism for presenting the content 710 may be provided. The content 710 may have been identified/provided by the retailer or by the account holder.

FIG. 8 depicts yet another illustrative online presentation of information 800 associated with a financial account that includes a representation of a content location identifier 808 that facilitates access to yet another illustrative type of content 810 relating to a financial transaction. The online presentation of information 800 may be provided via, for example, a browser window 802 displaying a web page associated with an online financial application or via any other suitable user interface. The presentation of information 800 may include various headings 804 similar to the headings 604, 704 depicted in FIGS. 6 and 7, respectively, that describe various aspects of the financial transaction information that is presented.

A representation 808 of a content location identifier associated with content relating to an illustrative financial transaction 806 may be presented. The representation 808 of the content location identifier may be presented in relatively close proximity to the financial transaction 806 with which it is associated. The example financial transaction 806 depicted in FIG. 8 may correspond, for example, to a retail purchase transaction or a similar transaction. While anchor text (e.g., "View Message") is depicted as being presented in FIG. 8, it should be appreciated that any suitable representation 808 of the content location identifier (including the content location identifier itself) may be presented. As previously described, the representation 808 of the content location identifier may be selectable, and selection by a user may initiate a process for retrieving the content 810 from a resource identified by the content location identifier. The content 810 illustratively depicted in FIG. 8 may correspond to textual content provided by a requestor (e.g., the account holder) at the time that the financial transaction 806 was initiated. Alternatively, the content 810 may correspond to an image of a greeting card or other message provided by the requestor to another party. The content 810 is illustratively depicted as being presented in a pop-up browser window; however, any suitable mechanism for presenting the content 810 may be provided. The content 810 may have been identified/provided by a retailer or by the account holder.

FIG. 9 depicts yet another illustrative online presentation of information 900 associated with a financial account that includes a representation of a content location identifier 908 and other information that facilitates access to yet another illustrative type of content relating to a financial transaction. The online presentation of information 900 may be provided via, for example, a browser window 902 displaying a web page associated with an online financial application or via any other suitable user interface. The presentation of information 900 may include various headings 904 similar to the headings 604, 704, 804 depicted in FIGS. 6-8, respectively, and which describe various aspects of the financial transaction information that is presented.

A representation 908 of a content location identifier associated with content relating to an illustrative financial transaction 906 may be presented. The representation 908 of the content location identifier may be presented in relatively close proximity to the financial transaction 906 with which it is associated. In addition, other information such as an access code 910 may also be provided in conjunction with the representation of the content location identifier 908. The example financial transaction 906 depicted in FIG. 9 may correspond, for example, to a retail purchase transaction such as an online purchase transaction. While the content location identifier 908 itself is shown as being presented in FIG. 9, it should be appreciated that any number of alternate representations of the content location identifier may be presented (e.g., anchor text).

As previously described, the representation 908 of the content location identifier may be selectable, and selection by a user may direct the user to a resource (e.g., a web page) identified by the content location identifier. The content location identifier may be further associated with electronically downloadable or streaming content such electronic content purchased as part of the financial transaction 906. In various embodiments, an access code 910 may also be presented with the representation 908 of the content location identifier. The access code 910 may have been received as part of the debit or credit instruction that included the content location identifier. The access code 910 may be utilized to download or stream the associated content.

For example, selection of the representation 908 of the content location identifier may cause the user to be directed to a resource (e.g., a web page). Selection of the representation 908 of the content location identifier may direct the user to a web page 912 identified by the content location identifier. The web page may include a data field 914 for inputting the code 910. The user may submit the entered code using, for example, the "submit" widget 916 and may be presented with an indication 918 of how much content has been downloaded. The content may correspond, for example, to a purchased electronic file.

FIG. 10 depicts yet another illustrative presentation of information 1000 associated with a financial account that includes various representations of various illustrative types of content relating to a financial transaction. The presentation of information 1000 may be associated with, for example, a printed financial account statement 1002.

The account statement 1002 may include various identifying information 1004. The statement 1002 may further include various headings 1006 similar to the headings 604, 704, 804, 904 depicted in FIGS. 6-9, respectively, and which describe various aspects of the financial transaction information that is presented. Various illustrative types of content 1008, 1010 may be presented in the statement 1002 in association with the associated financial transactions. The content 1008, 1010 may correspond to modified versions of original content relating to the financial transactions. For example, the original content may have to be reduced in size to generate the content 1008, 1010 in order to facilitate inclusion of the content in the statement 1002.

While various illustrative presentations of the information and types of content have been described in connection with FIGS. 6-10, it should be appreciated that numerous other variations, modifications, and so forth are within the scope of this disclosure. Further, although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, although specific example embodiments have been presented, it should be appreciated that numerous other examples are within the scope of this disclosure.

Additional types of CRSM that may be present in association with any of the components described herein (e.g., any of the components of the networked architecture 100) may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, solid-state memory devices, or any other medium. Combinations of any of the above are also included within the scope of CRSM.

Alternatively, computer-readable communication media may include computer-readable instructions, program modules, or other data transmitted within a data signal, such as a carrier wave, or other transmission. However, as used herein, CRSM does not include computer-readable communication media. Examples of computer-readable communication media, whether modulated using a carrier or not, include, but are not limited to, signals that a computer system or machine hosting or running a computer program can be configured to access, including signals downloaded through the Internet or other networks. For example, the distribution of software may be an Internet download.

That which is claimed is:

1. A system, comprising: at least one memory storing computer-executable instructions; and at least one processor communicatively coupled to the at least one memory, wherein the at least one processor is configured to access the at least one memory and execute the computer-executable instructions to: receive, on behalf of a requestor, a request to execute or request a financial transaction involving a financial account, wherein the request comprises transaction data necessary to credit an amount of funds as part of the financial transaction; generate remittance data relating to the financial transaction, wherein i) the remittance data comprises structured data formatted in accordance with a structured data format, and ii) at least a portion of the remittance data is not included in a credit instruction to post a credit to the financial account, wherein the credit instruction i) is associated with the financial transaction and ii) comprises the transaction data; store the remittance data at a network resource; generate a shortened uniform resource locator (URL) that identifies a network location of the network resource; generate the credit instruction; insert the shortened URL into at least one data field of the credit instruction; and direct transmission of the credit instruction to one of: i) a payment network or ii) a financial institution associated with the financial account, the credit instruction comprising the amount of funds and the shortened URL, wherein the shortened URL at least enables retrieval of the at least a portion of the remittance data that is not included in the credit instruction from the network resource for use by a first system associated with the financial institution or a second system associated with an account holder of the financial account in updating one or more data records corresponding to an account being paid.

2. The system of claim 1, wherein the at least one processor is further configured to execute the computer-executable instructions to: determine a type of the credit instruction; determine the at least one data field based at least in part on a message instruction format associated with the type of the credit instruction.

3. The system of claim 2, wherein the at least one data field is a first at least one data field, and wherein the at least one processor is further configured to execute the computer-executable instructions to: determine a second at least one data field in the credit instruction based at least in part on the message instruction format associated with the type of the credit instruction; determine a data allocation of the second at least one data field; determine at least a portion of the remittance data having a size that does not exceed the data allocation; and insert the at least a portion of the remittance data into the second at least one data field of the credit instruction.

4. The system of claim 1, wherein the structured data is first structured data and the structured data format is a first structured data format, and wherein the at least one processor is further configured to execute the computer-executable instructions to: receive, from a requesting system, a second request for at least a portion of the remittance data, wherein the requesting system is the first system or the second system, and wherein the second request comprises the shortened URL; retrieve the at least a portion of the remittance data from the network resource; determine that the requesting system is not configured to interpret the first structured data format; format the at least a portion of the remittance data to generate second structured data, wherein the second structured data is formatted in accordance with a second structured data format that the requesting system is configured to interpret; and direct transmission of the second structured data to the requesting system.

5. The system of claim 1, wherein the at least one processor is further configured to execute the computer-executable instructions to: receive, from a requesting system, a third request for a visual representation of the remittance data, wherein the requesting system is the first system or the second system, and wherein the third request comprises the shortened URL; retrieve the remittance data from the network resource; generate the visual representation of the remittance data; and direct transmission of the visual representation of the remittance data to the requesting system.

6. A method, comprising: receiving, on behalf of a requestor, by a computerized service provider system comprising one or more payment processing computers, a request to execute or request a financial transaction involving a financial account, wherein the request comprises transaction data necessary to credit an amount of funds as part of the financial transaction; generating, by the computerized service provider system, remittance data relating to the financial transaction, wherein i) the remittance data comprises structured data formatted in accordance with a structured data format, and ii) at least a portion of the remittance data is not included in a credit instruction to post a credit to the financial account, wherein the credit instruction i) is associated with the financial transaction and ii) comprises the transaction data; storing, by the computerized service provider system, the remittance data at a network resource; generating, by the computerized service provider system, a shortened uniform resource locator (URL) that identifies a network location of the network resource; generating the credit instruction; inserting the shortened URL into at least one data field of the credit instruction; and directing transmission of credit instruction to one of: i) a payment network or ii) a financial institution associated with the financial account, the credit instruction comprising the amount of funds and the shortened URL, wherein the shortened URL at least enables retrieval of the at least a portion of the remittance data that is not in the credit instruction from the network resource for use by a first system associated with the financial institution or a second system associated with an account holder of the financial account in updating one or more data records corresponding to the financial account.

7. The method of claim 6, further comprising: determine a type of the credit instruction; determine the at least one data field based at least in part on a message instruction format associated with the type of the credit instruction.

8. The method of claim 7, wherein the at least one data field is a first at least one data field, the method further comprising: determining a second at least one data field in the credit instruction based at least in part on the message instruction format associated with the type of the credit instruction; determining a data allocation of the second at least one data field; determining at least a portion of the remittance data having a size that does not exceed the data allocation; and inserting the at least a portion of the remittance data into the second at least one data field.

9. The method of claim 6, wherein the remittance data comprises first structured data formatted in accordance with a first structured data format, the method further comprising: receiving, from a requesting system, a second request for at least a portion of the remittance data, wherein the requesting system is the first system or the second system, and wherein the second request comprises the shortened URL; retrieving the at least a portion of the remittance data from the network resource; determining that the requesting system is not configured to interpret the first structured data format; formatting the at least a portion of the remittance data to generate second structured data, wherein the second structured data is formatted in accordance with a second structured data format that the requesting system is configured to interpret; and directing transmission of the second structured data to the requesting system.

10. The method of claim 6, wherein the network resource is network storage associated with the requestor, the method further comprising: obtaining authentication credentials on behalf of the requestor; and accessing the network storage using the authentication credentials.

11. The method of claim 6, further comprising: receiving, on behalf of the requestor, a permission identifier, wherein the permission identifier indicates an entity permitted to use the shortened URL to retrieve the remittance data; and storing the permission identifier in association with at least one of the remittance data or the shortened URL.

12. The method of claim 11, further comprising: receiving, from a requesting system, a third request for the remittance data, wherein the third request comprises the shortened URL, and wherein the requesting system is the first system or the second system; determining that the receiving system corresponds to the entity indicated by the permission identifier; retrieving the remittance data from the network resource; and directing transmission of the remittance data to the requesting system.

13. The method of claim 6, wherein an online banking presentation of information associated with the financial account comprises a selectable representation of the shortened URL, and wherein selection of the selectable representation enables retrieval of the remittance data from the network resource and presentation of the remittance data in the online banking presentation.

14. A computer program product, stored on a non-transitory computer readable medium, comprising instructions that when executed on one or more computers cause the one or more computers to: receive, on behalf of a requestor, a request to execute or request a financial transaction involving a financial account, wherein the request comprises transaction data necessary to credit an amount of funds as part of the financial transaction; generate remittance data relating to the financial transaction, wherein i) the remittance data comprises structured data formatted in accordance with a structured data format, and ii) at least a portion of the remittance data is not included in a credit instruction to post a credit to the financial account, wherein the credit instruction i) is associated with the financial transaction and ii) comprises the transaction data; store the remittance data at a network resource; generate a shortened uniform resource locator (URL) that identifies a network location of the network resource; generate the credit instruction; insert the shortened URL into at least one data field of the credit instruction; and direct transmission of the credit instruction to one of, i) a payment network or ii) a financial institution associated with the financial account, the credit instruction comprising the amount of funds and the shortened URL, wherein the shortened URL at least enables retrieval of the at least a portion of the remittance data that is not in the credit instruction from the network resource for use by a first system associated with the financial institution or a second system associated with an account holder of the financial account in updating one or more data records corresponding to the financial account.

15. The computer program product of claim 14, comprising further instructions that when executed on one or more computers cause the one or more computers to: determine a type of the credit instruction; determine the at least one data field based at least in part on a message instruction format associated with the type of the credit instruction.

16. The computer program product of claim 15, comprising further instructions that when executed on one or more computers cause the one or more computers to: determine a second at least one data field in the credit instruction based at least in part on the message instruction format associated with the type of the credit instruction; determine a data allocation of the second at least one data field; determine at least a portion of the remittance data having a size that does not exceed the data allocation; and insert the at least a portion of the remittance data into the second at least one data field of the credit instruction.

17. The computer program product of claim 14, comprising further instructions that when executed on one or more computers cause the one or more computers to: receive, from a requesting system, a second request for at least a portion of the remittance data, wherein the requesting system is the first system or the second system, and wherein the second request comprises the shortened URL; retrieve the at least a portion of the remittance data from the network resource; determine that the requesting system is not configured to interpret the first structured data format; format the at least a portion of the remittance data to generate second structured data, wherein the second structured data is formatted in accordance with a second structured data format that the requesting system is configured to interpret; and direct transmission of the second structured data to the requesting system.

18. The computer program product of claim 14, comprising further instructions that when executed on one or more computers cause the one or more computers to: receive, from a requesting system, a third request for a visual representation of the remittance data, wherein the requesting system is the first system or the second system, and wherein the third request comprises the shortened URL; retrieve the remittance data from the network resource; generate the visual representation of the remittance data; and direct transmission of the visual representation of the remittance data to the requesting system.

* * * * *